United States Patent
Agrawal et al.

(10) Patent No.: US 12,243,340 B2
(45) Date of Patent: *Mar. 4, 2025

(54) SYSTEM AND METHOD FOR DOMAIN AWARE DOCUMENT CLASSIFICATION AND INFORMATION EXTRACTION FROM CONSUMER DOCUMENTS

(71) Applicant: Informed, Inc., San Francisco, CA (US)

(72) Inventors: Jatin Agrawal, San Francisco, CA (US); Ashwin Kannan, San Ramon, CA (US); Harshil Prajapati, San Francisco, CA (US); Bharath Rengarajan, Foster City, CA (US); Eric Harvey, San Leandro, CA (US); Emma Wei, Cupertino, CA (US)

(73) Assignee: Informed, inc., Belvedere Tiburon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/590,472

(22) Filed: Feb. 28, 2024

(65) Prior Publication Data

US 2024/0203149 A1      Jun. 20, 2024

Related U.S. Application Data

(63) Continuation of application No. 17/134,780, filed on Dec. 28, 2020, now Pat. No. 11,928,878.

(Continued)

(51) Int. Cl.
   *G06F 17/00* (2019.01)
   *G06F 40/226* (2020.01)
   (Continued)

(52) U.S. Cl.
   CPC .......... *G06V 30/416* (2022.01); *G06F 40/226* (2020.01); *G06F 40/289* (2020.01);
   (Continued)

(58) Field of Classification Search
   CPC .. G06V 30/416; G06V 30/412; G06V 30/414; G06V 30/10; G06F 40/226; G06F 40/289; G06F 40/30
   See application file for complete search history.

(56) References Cited

U.S. PATENT DOCUMENTS

| 8,015,087 B2 | 9/2011 | Grove |
| 8,392,294 B2 | 3/2013 | MacInnis |

(Continued)

FOREIGN PATENT DOCUMENTS

WO      2010134534 A1      11/2010

OTHER PUBLICATIONS

Ahmed, Zeeshan. "Domain specific information extraction for semantic annotation." (2010) (Year: 2010).*

(Continued)

*Primary Examiner* — Andrew T McIntosh
(74) *Attorney, Agent, or Firm* — Inventive Law Inc.; Jim H. Salter

(57) ABSTRACT

A system and method for domain aware document classification and information extraction from consumer documents are disclosed. A particular embodiment is configured to: establish, by use of a data processor and a data network, a data connection with at least one applicant platform; receive an upload of documents from the applicant platform via the data network; classify each document as being of a particular document type; determine an information extraction strategy based on a document type classification of a particular document; and extract information from the particular document based on the information extraction strategy.

20 Claims, 20 Drawing Sheets

Related U.S. Application Data

(60) Provisional application No. 63/123,732, filed on Dec. 10, 2020, provisional application No. 63/070,678, filed on Aug. 26, 2020.

(51) Int. Cl.
*G06F 40/289* (2020.01)
*G06F 40/30* (2020.01)
*G06V 30/412* (2022.01)
*G06V 30/414* (2022.01)
*G06V 30/416* (2022.01)
*G06V 30/10* (2022.01)

(52) U.S. Cl.
CPC ............ *G06F 40/30* (2020.01); *G06V 30/412* (2022.01); *G06V 30/414* (2022.01); *G06V 30/10* (2022.01)

(56) References Cited

U.S. PATENT DOCUMENTS

| | | | |
|---|---|---|---|
| 8,626,617 | B1 | 1/2014 | Bhatt |
| 9,053,504 | B2 | 6/2015 | Taylor |
| 9,280,786 | B2 | 3/2016 | Moissinac |
| 10,657,603 | B1 * | 5/2020 | Harding ................ G06F 16/116 |
| 2007/0185777 | A1 | 8/2007 | Pyle |
| 2009/0157522 | A1 | 6/2009 | Srinivasan |
| 2010/0161408 | A1 | 6/2010 | Karson |
| 2012/0284087 | A1 | 11/2012 | Pollak |
| 2012/0284113 | A1 | 11/2012 | Pollak |
| 2012/0323822 | A1 | 12/2012 | Wei |
| 2013/0124360 | A1 | 5/2013 | Mitrovic |
| 2014/0052327 | A1 | 2/2014 | Hosein |
| 2014/0052745 | A1 | 2/2014 | Hosein |
| 2014/0067614 | A1 | 3/2014 | Hygema |
| 2014/0279275 | A1 | 9/2014 | Burgiss |
| 2016/0042408 | A1 | 2/2016 | Tobin |
| 2016/0092950 | A1 | 3/2016 | Driscoll |
| 2019/0220660 | A1 | 7/2019 | Cali |
| 2021/0073534 | A1 | 3/2021 | Rawat |
| 2021/0350516 | A1 | 11/2021 | Tang |
| 2022/0067365 | A1 | 3/2022 | Agrawal |

OTHER PUBLICATIONS

Mishra, Bhavana Dalvi, Niket Tandon, and Peter Clark. "Domain-targeted, high precision knowledge extraction." Transactions of the Association for Computational Linguistics 5 (2017): 233-246 (Year: 2017).*

Mariyah, Siti, and Dwi Hendratmo Widyantoro. "A multi-strategy approach for information extraction of financial report documents." 2015 International Conference on Information & Communication Technology and Systems (ICTS). IEEE, 2015 (Year: 2015).

Sarkhel, Ritesh, and Arnab Nandi. "Visual segmentation for information extraction from heterogeneous visually rich documents." Proceedings of the 2019 international conference on management of data. 2019 (Year: 2019).

* cited by examiner

Classification Flow for a Single Page Document

Merging and Grouping of Document Pages

Merging and Grouping of Document Pages

Merging and Grouping of Document Pages

Merging and Grouping of Document Pages

SYSTEM AND METHOD FOR DOMAIN AWARE DOCUMENT CLASSIFICATION AND INFORMATION EXTRACTION FROM CONSUMER DOCUMENTS

PRIORITY PATENT APPLICATIONS

This non-provisional patent application is a continuation application drawing priority from U.S. non-provisional patent application Ser. No. 17/134,780; filed Dec. 28, 2020; which is a non-provisional patent application drawing priority from U.S. provisional patent application Ser. No. 63/070,678; filed Aug. 26, 2020; and drawing priority from U.S. provisional patent application Ser. No. 63/123,732; filed Dec. 10, 2020. This present non-provisional continuation patent application draws priority from the referenced patent applications. The entire disclosure of the referenced patent applications is considered part of the disclosure of the present application and is hereby incorporated by reference herein in its entirety.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the disclosure, software, and data as described below and in the drawings that form a part of this document: Copyright 2019-2024 Informed, Inc., All Rights Reserved.

TECHNICAL FIELD

This patent application relates to computer-implemented software systems, according to one embodiment, and more specifically to a system and method for domain aware document classification and information extraction from consumer documents.

BACKGROUND

In today's indirect lending industry, most of the loans are approved by the lenders with the contingency that the stipulations need to be cleared. These stipulations can be cleared by the presentation of one or more valid documents. Currently, the lenders receive these documents via various sources, such as electronic mail, fax, third party portals, physical mail, etc. The lenders need to pay an external agency to convert the physical document pages into scanned electronic copies. Once the electronic copies have been loaded into the lender's software, a "funder" working for the lender needs to go through each and every page to determine which document type a page is and to which document the page belongs. Funders need to group the documents based on the time period, as some stipulations require documents spanning over multiple time periods. There can be anywhere from 100 to 200 pages in any application that the funder analyzes.

In most cases, when the lender first receives the document from the dealer, many important documents that are needed for approval of the loan are missing. Once the dealer sends over the missing documents to the lender, the funder needs to repeat the above steps again and re-evaluate the validity of each stipulation that needs to be cleared. All of these steps are time-consuming and error-prone. As such, conventional document classification and information extraction has been unable to meet the need for timely, efficient, and accurate document classification and information extraction.

SUMMARY

In various example embodiments described herein, a system and method for domain aware document classification and information extraction from consumer documents are disclosed. In the various example embodiments described herein, a computer-implemented tool or software application (app) as part of a document classification and information extraction system is described to automate and improve the collection and classification of documents, the extraction of relevant information from the documents, and the verification of stipulations between parties in a transaction. As described in more detail below, a computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, consumer electronic devices, or any other type of computing, data processing, communication, networking, or electronic system.

In various example embodiments described herein, document classification and information extraction pipelines are described, which use a combination of state-of-the-art classifiers and domain knowledge inspired engines as it relates to the customer finance industry. The various example embodiments are configured to work well on particular applications rather than optimizing them to work well on standard classification problems like text classification with multiple labels. Moreover, the various example embodiments are configured to work with variations in document quality. The domain inspired engines, as described herein, are configured to handle various challenges, like Optical Character Recognition (OCR) errors on a scanned or faxed document. The various example embodiments are also configured to recognize and process various types of industry level documents, such as, utility bills, insurance bills, savings and checking account statements, and the like. The various example embodiments include various machine learning processors along with domain expertise to take the logical group of documents and perform verifications on them. It is not feasible to apply verifications without knowing the logical grouping of these types of documents.

Furthermore, there are various services that provide information extraction from documents; but, these services don't cater to consumer loan applications and specific document types. These services don't have the schema for various documents and hence don't know what the relevant information is that might be extracted. Given their generic nature, these services also don't provide a reasonable level of accuracy, which makes their solutions not feasible for automating the loan verification process. Additionally, these services also don't have or use any of the applicant information or application information as more context towards these entity or information extractions.

The example embodiments of an information extraction pipeline as disclosed herein are optimized to work well on a consumer loan application. The example embodiments use the context from the consumer and various other domain information sources to be more accurate. Given the variation of document quality, the example embodiments implement various strategies that work on different quality documents.

These strategies include strict and loose strategies enabling the example embodiments to do a better job at extracting various information entities from the document. The strategies also take into account various limitations of state of the art OCR technology and try to minimize the negative impact.

In the various example embodiments disclosed herein, an information extraction system supports relevant information extraction from various structured and unstructured documents provided in a consumer loan application. The example embodiments support various relevant fields, ranging from names, addresses, income, monthly bank deposits, monthly pay, etc.

The various example embodiments disclosed herein combine a classification pipeline with an extraction pipeline to ensure a very high level of accuracy. Due to our classification pipeline, we are able to use document type specific strategies. Generalized models do not work as well as our combination of a classification and extraction model, because of the extra context we have to extract information entities.

In the various example embodiments disclosed herein, an information extraction system supports an information extraction pipeline, which pre-processes a document using the document type and applies various strategies to extract information from the document. The example embodiments support various validation strategies and models based on domain knowledge in place to help us increase our accuracy. Details of the various example embodiments disclosed herein are provided below and in the accompanying drawings.

BRIEF DESCRIPTION OF THE DRAWINGS

The various embodiments are illustrated by way of example, and not by way of limitation, in the figures of the accompanying drawings in which:

FIG. 13 illustrates an example of a W2 document having a plurality of sections as processed by the information extraction pipeline;

FIG. 14 illustrates an example of a document having a plurality of tables as processed by the information extraction pipeline;

FIG. 16 illustrates an example of a W2 document for which key-value pairs can be processed by the information extraction pipeline;

DETAILED DESCRIPTION

Figure 1:
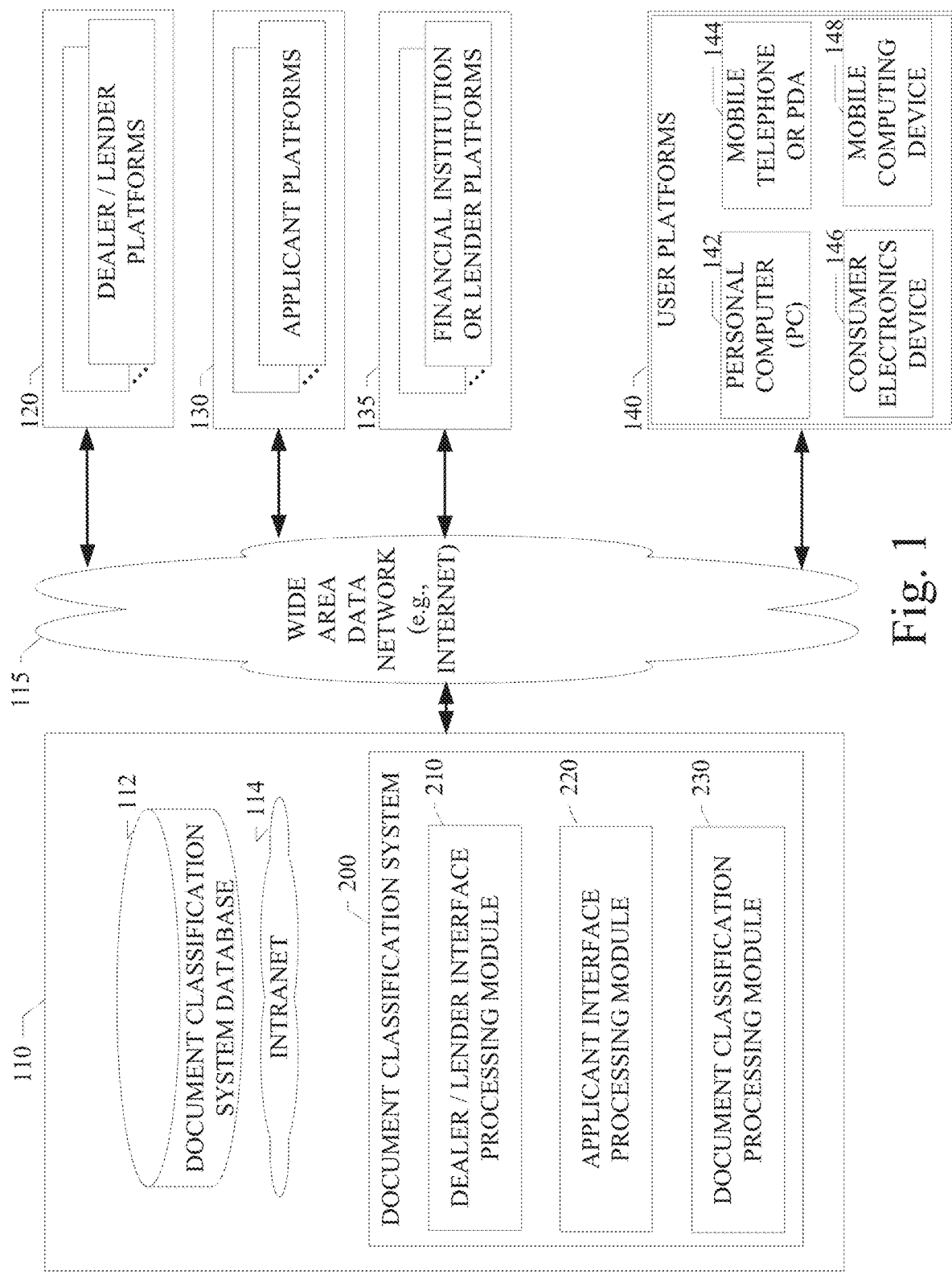
FIG. 1 illustrates an example embodiment of a networked system in which various embodiments may operate.

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments described herein, a system and method for domain aware document classification and information extraction from consumer documents are disclosed. In the various example embodiments described herein, a computer-implemented tool or software application (app) as part of a document classification and information extraction system is described to automate and improve the collection of documents and the verification of stipulations between parties in a transaction. As described in more detail below, a computer or computing system on which the described embodiments can be implemented can include personal computers (PCs), portable computing devices, laptops, tablet computers, personal digital assistants (PDAs), personal communication devices (e.g., cellular telephones, smartphones, or other wireless devices), network computers, consumer electronic devices, or any other type of computing, data processing, communication, networking, or electronic system.

In various example embodiments described herein, document classification and information extraction pipelines are described, which use a combination of state-of-the-art classifiers and domain knowledge inspired engines as it relates to the customer finance industry. The various example embodiments are configured to work well on particular applications rather than optimizing them to work well on standard classification problems like text classification with multiple labels. Moreover, the various example embodiments are configured to work with variations in document quality. The domain inspired engines, as described herein, are configured to handle various challenges, like OCR errors on a scanned or faxed document. The various example embodiments are also configured to recognize and process various types of industry level documents, such as, utility bills, insurance bills, savings and checking account statements, and the like. The various example embodiments include various machine learning processors along with domain expertise to take the logical group of documents and perform verifications on them. It is not feasible to apply verifications without knowing the logical grouping of these types of documents.

In various example embodiments described herein, the document classification and information extraction system provides a series of processes to help, for example, dealers and/or lenders collect and verify documents pertaining to stipulations from primary applicants, co-applicants, their own personnel, and/or other parties to a transaction. In an example embodiment, documents are immediately analyzed using machine learning techniques to provide real-time feedback to the applicant regarding deficiencies that prevent the stipulation from being satisfied.

In various example embodiments described herein, the document classification and information extraction system provides a document collection and verification system as it relates to the consumer finance industry, specifically, to indirect and direct lending. The various example embodiments described herein enable indirect loan applicants and dealer personnel to upload documents and get near real-time feedback on issues that could delay the lender from accepting the document. The various example embodiments described herein also support the direct lending space (including auto lending), where applicants are not delayed in receiving feedback on documents they submit to a lender's loan officer. The various example embodiments described herein enable direct lending applicants to upload documents and instantly receive feedback on discrepancies or deficiencies that could delay their loan's funding or completion of a related transaction. Details of the various example embodiments are described in more detail below.

FIG. 1, in an example embodiment, illustrates a system and method for domain aware document classification and processing. In various example embodiments, an application or service, typically provided by or operating on a host site (e.g., a website) 110, is provided to simplify and facilitate the downloading or hosted use of the document classification system 200 of an example embodiment. In a particular embodiment, the document classification system 200 can be downloaded from the host site 110 by a user at a user platform 140. Alternatively, the document classification system 200 can be hosted by the host site 110 for a networked user at a user platform 140. The details of the document classification system 200 for an example embodiment are provided below.

Referring again to FIG. 1, the document classification system 200 can be in network communication with a plurality of dealer/lender platforms 120 and/or applicant platforms 130. The dealer/lender platforms 120 can include user platform computing and/or communication devices, websites, or other network resources at which product sellers or brokers operate or at which information regarding sellers and products (e.g., vehicles) offered for sale is available. In some cases, seller/brokers operating at the dealer/lender platforms 120 can have their own finance departments from which loan applications or credit applications for customers or consumers can be processed. The document classification system 200 can be configured to provide data communications for the user platforms serving as networked platforms for product sellers/brokers and to obtain seller information, product information, and consumer information in a digital or computer-readable form via the network 115. The applicant platforms 130 can include user platform computing and/or communication devices configured to serve as networked platforms for product consumers (e.g., potential product buyers) and to obtain consumer information including, consumer financing information, consumer characteristics, consumer activities, consumer product interests, or other consumer information. The document classification system 200 can be configured to obtain this consumer information in a digital or computer-readable form via the network 115. The document classification system 200 can also be in network data communication with a plurality of other information sites, such as consumer data or credit reporting platforms, and/or product valuation or rating sites. These types of on-line consumer data or credit reporting sites and product valuation or rating sites are well known to those of ordinary skill in the art.

The document classification system 200 can also be in network data communication with a plurality of on-line financial institution or lender sites 135. The document classification system 200 be configured to provide data communications for the user platforms or websites serving as networked platforms for on-line financial institutions or lenders and to obtain potential consumer-related financing, loan, or credit information in a digital or computer-readable form from one or more of the on-line financial institution or lender platforms 135 via the network 115. The document classification system 200 be also be configured to provide data communications for the on-line financial institution or lender platforms 135 to enable the networked usage, transfer, or downloading of a dealer/lender interface processing module 210. The dealer/lender interface processing module 210 may initially reside with a financial institution or lender 135 or may be downloaded to or from the host site 110. In other words, the dealer/lender interface processing module 210 may be used, transferred, or downloaded to the host site 110 and the document classification system 200 therein via the network 115. As such, the dealer/lender interface processing module 210 may be hosted by the host site 110 or locally resident and locally used by a dealer or lender at dealer/lender platform 120 and/or a consumer at an applicant platform 130.

One or more of the dealer/lender platforms 120, the applicant platforms 130, and the on-line financial institution or lender sites 135 can be provided by one or more third party providers operating at various locations in a network ecosystem. It will be apparent to those of ordinary skill in the art that dealer/lender platforms 120 or applicant platforms 130 can include or be any of a variety of networked third party information providers or on-line vendors or merchants as described in more detail below. In a particular embodiment, a resource list maintained at the host site 110 can be used as a summary or list of all dealer/lender platforms 120, applicant platforms 130, and on-line financial institution or lender sites 135, which users or the host site 110 may visit/access and from which users or the host site 110 can obtain seller data, product data, consumer data, or consumer financial or credit information. The host site 110, dealer/lender platforms 120, applicant platforms 130, on-line financial institution or lender sites 135, and user platforms 140 may communicate and transfer data and information in the data network ecosystem shown in FIG. 1 via a wide area data network (e.g., the Internet) 115. Various components of the host site 110 can also communicate internally via a conventional intranet or local area network (LAN) 114.

Networks 115 and 114 are configured to couple one computing device with another computing device. Networks 115 and 114 may be enabled to employ any form of computer readable media for communicating information from one electronic device to another. Network 115 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

Networks 115 and 114 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Networks 115 and 114 may also include an autonomous system of terminals, gateways, routers, and the like connected by wireless radio links or wireless transceivers. These connectors may be configured to move freely and randomly and organize themselves arbitrarily, such that the topology of networks 115 and 114 may change rapidly and arbitrarily.

Networks 115 and 114 may further employ a plurality of access technologies including 2nd (2G), 2.5, 3rd (3G), 4th (4G), 5th (5G) generation radio access for cellular systems, WLAN, Wireless Router (WR) mesh, and the like. Access technologies such as 2G, 3G, 4G, 5G, and future access networks may enable wide area coverage for mobile devices, such as one or more of client devices 141, with various degrees of mobility. For example, networks 115 and 114 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Networks 115 and 114 may also be constructed for use with various other wired and wireless communication protocols, including TCP/IP, UDP, SIP, SMS, RTP, WAP, CDMA, TDMA, EDGE, UMTS, GPRS, GSM, UWB, WiFi, WiMax, IEEE 802.11x, and the like. In essence, networks 115 and 114 may include virtually any wired and/or wireless communication mechanisms by which information may travel between one computing device and another computing device, network, and the like. In one embodiment, network 114 may represent a LAN that is configured behind a firewall (not shown), within a business data center, for example.

The dealer/lender platforms 120, applicant platforms 130, and/or the on-line financial institution or lender sites 135 may include any of a variety of providers of network transportable digital data. The network transportable digital data can be transported in any of a family of file formats and associated mechanisms usable to enable a host site 110 and a user platform 140 to receive seller or product data from a dealer/lender platform 120, to receive consumer data from an applicant platform 130, and/or to receive buyer financing or credit information from an on-line financial institution or lender sites 135 over the network 115. In one embodiment, the file format can be a Microsoft™ Excel spreadsheet format or a CSV (Comma Separated Values) format; however, the various embodiments are not so limited, and other file formats and transport protocols may be used. For example, data formats other than Excel or CSV or formats other than open/standard formats can be supported by various embodiments. Any electronic file format, such as Microsoft™ Access Database Format (MDB), Portable Document Format (PDF), audio (e.g., Motion Picture Experts Group Audio Layer 3—MP3, and the like), video (e.g., MP4, and the like), and any proprietary interchange format defined by specific sites can be supported by the various embodiments described herein. Moreover, a dealer/lender platform 120, an applicant platform 130, and/or an on-line financial institution or lender sites 135 may provide a variety of different data sets or computational modules.

In a particular embodiment, a user platform 140 with one or more client devices enables a user to access data provided by the document classification system 200 via the host 110 and network 115. Client devices of user platform 140 may include virtually any computing device that is configured to send and receive information over a network, such as network 115. Such client devices may include portable devices 144, such as, cellular telephones, smart phones, camera phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. The client devices may also include other computing devices, such as personal computers 142, multi-processor systems, microprocessor-based or programmable consumer electronics, network PC's, and the like. The client devices may also include other processing devices, such as consumer electronic (CE) devices 146 and/or mobile computing devices 148, which are known to those of ordinary skill in the art. As such, the client devices of user platform 140 may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a full screen color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, Extensible HTML (xHTML), Compact HTML (CHTML), and the like, to display and/or send digital information. In other embodiments, mobile devices can be configured with applications (apps) with which the functionality described herein can be implemented.

The client devices of user platform 140 may also include at least one client application that is configured to receive product data, consumer data, financing data, and/or control data from another computing device via a wired or wireless network transmission. The client application may include a capability to provide and receive textual data, graphical data, video data, audio data, and the like. Moreover, client devices of user platform 140 may be further configured to communicate and/or receive a message, such as through a Short Message Service (SMS), direct messaging (e.g., Twitter™), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Referring again to FIG. 1, the document classification system 200 for an example embodiment is shown to include a document classification system database 112. The database 112 can be used to retain a variety of information data sets including, but not limited to, seller information, product or product listing information, consumer information, buyer financing or credit information, loan information, targeted buyer group or custom audience information, advertisement (ad) data, buyer/seller/product analytics, and the like. It will be apparent to those of ordinary skill in the art that the document classification system database 112 can be locally resident at the host site 110 or remotely located at other server locations or stored in network cloud storage.

Referring again to FIG. 1, host site 110 of an example embodiment is shown to include the document classification system 200. In an example embodiment, document classification system 200 can include a dealer/lender interface processing module 210, an applicant interface processing module 220, and a document classification processing module 230. Each of these modules can be implemented as software components executing within an executable environment of document classification system 200 operating on host site 110 or user platform 140. Each of these modules of an example embodiment is described in more detail below in connection with the figures provided herein.

Referring still to FIG. 1, the document classification system 200 can include a dealer/lender interface processing module 210 and an applicant interface processing module 220. The dealer/lender interface processing module 210 can facilitate communication and the transfer of data and documents between a user at a dealer/lender platform 120 and the host site 110. The applicant interface processing module 220 can facilitate communication and the transfer of data and documents between a user at an applicant platform 130 and the host site 110. The dealer/lender interface processing module 210 and the applicant interface processing module 220 can be configured to perform the processing as described in more detail below. The dealer/lender interface processing module 210 can be resident at the host site 110, resident on a dealer/lender platform 120, or partially resident on a plurality of user platforms 140. Similarly, the applicant interface processing module 220 can be resident at the host site 110, resident on an applicant platform 130, or partially resident on a plurality of user platforms 140. The document classification system 200 be configured to provide data communications for the dealer/lender platforms 120 and the applicant platforms 130 to enable the networked usage, transfer, or downloading of information, requests, images, documents, and related data to facilitate the gathering and validation of stipulations related to a seller/consumer transaction. The components and processes for the gathering and validation of stipulations related to a seller/consumer transaction as embodied in the dealer/lender interface processing module 210 and the applicant interface processing module 220 are described in more detail below.

Figure 2:
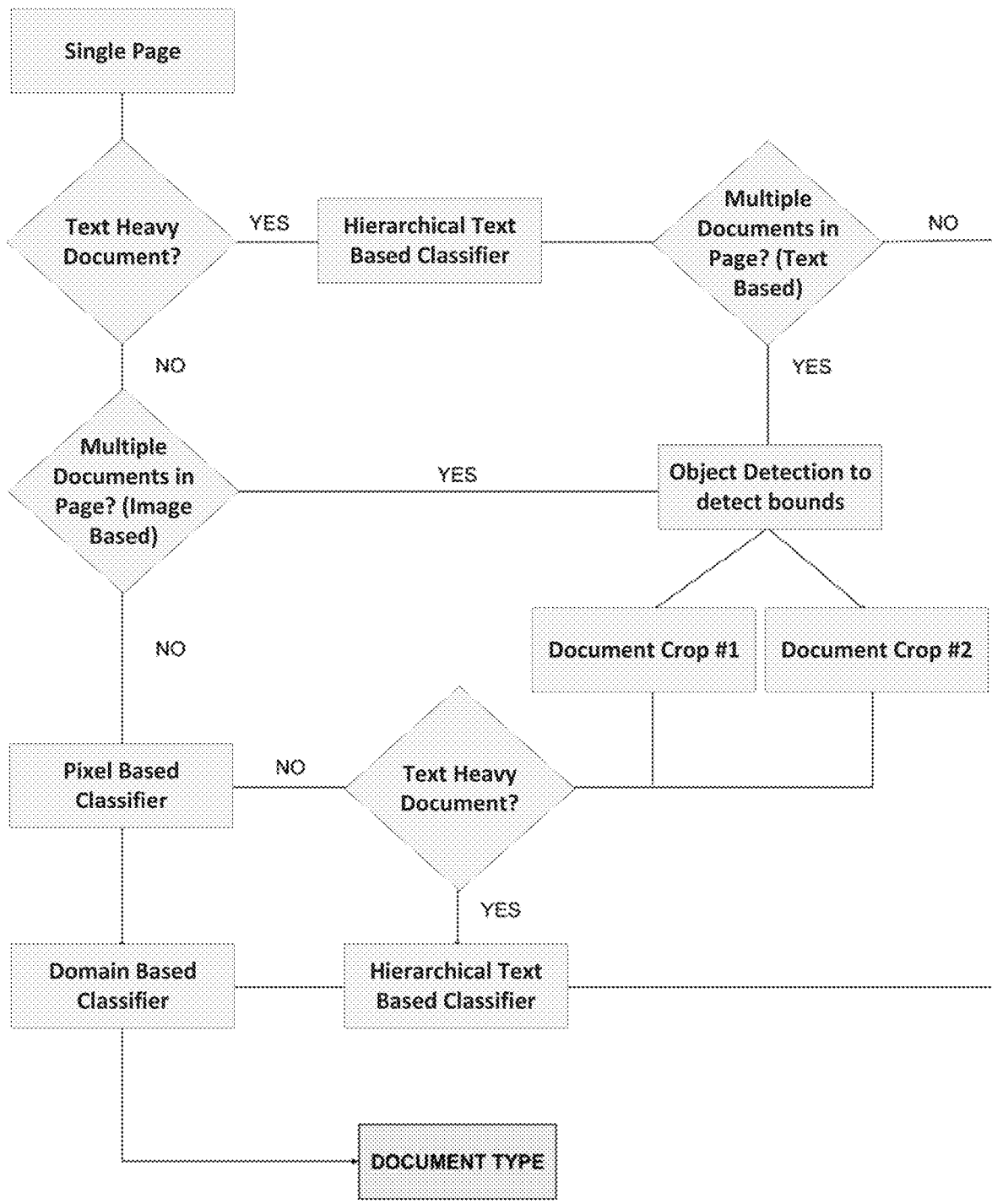
FIG. 2 illustrates a processing flow diagram that shows an example embodiment of a method for classifying a single page document as described herein.

Referring now to FIG. 2, an example embodiment provides a system and method that allows dealers and/or lenders to use the dealer/lender interface processing module 210 via a dealer/lender platform 120 to initiate a process whereby a primary applicant, a co-applicant, and/or their own personnel can use the applicant interface processing module 220 via an applicant platform 130 to submit stipulation documents using the applicant platform 130 and receive instant feedback on whether the processed documents will help to satisfy a stipulation related to a transaction. In an example embodiment on a computing device of a dealer/lender platform 120, dealers in the example embodiment can initiate a process of requesting stipulation documentation from an applicant. In the example embodiment, the applicant can be asked, via an applicant platform 130, to provide several stipulation documents, including, among others, a credit application, proof of insurance, driver license, proof of residence, proof of income, and/or references, etc. The example embodiments described herein improve the existing technologies by allowing these stipulation documents to be processed, classified, merged, collated, and grouped to facilitate the stipulation compliance process for the applicant. The processed stipulation documents can be automatically and securely sent electronically to dealers and/or lenders for immediate processing, thereby eliminating delays, lost documents, and redundant documents. The requested applicant stipulation documents can be received by the dealers and/or lenders via the dealer/lender interface processing module 210 and the dealer/lender platform 120.

An example embodiment provides a system and method that allows dealers and/or lenders to specify different sets of stipulation documents they want to receive from primary applicants, co-applicants, and/or their own personnel. This feature of the example embodiment enables dealers and/or lenders to specify whether any single stipulation document from a set of stipulation documents pertaining to a transaction stipulation will clear the stipulation or if all documents pertaining to a stipulation are required. This feature of the example embodiment improves the technology by allowing dealers and/or lenders to not request documents they already have. This serves to reduce network traffic and eliminate unnecessary electronic document transfers.

An example embodiment provides a system and method that allows the dealer and/or lender at a dealer/lender platform 120 to securely transfer data and documents between their computer (or computer systems that the dealer and/or lender contracts with) and the host site 110, which can be a third-party's cloud-based computing cluster. This secure data transfer capability can be implemented and controlled by the dealer/lender interface processing module 210. This secure data transfer capability enables the dealer and/or lender to share: (i) documents previously collected that need analysis to determine whether they satisfy stipulations, (ii) missing documents that still need to be collected to satisfy stipulations, and (iii) information commonly found in a credit application, including, but not limited to, information pertaining to the primary applicant, the co-applicant (if any), the collateral being financed, any collateral being traded-in, and the terms of the loan/lease requested. This data transfer may take place using protocols such as HTTP, FTP, SMTP, etc., whereby information, that may be encrypted using SSL/TLS, is exchanged in a variety of formats (including, but not limited to, XML and JSON formats). The dealer and/or lender can share data with the host site 110 specifying which documents require analysis or collection along with supplying information commonly found in a credit application.

In an example embodiment, a dealer/lender can use a dealer/lender platform 120 to generate a transaction application for a particular applicant. The application can include a list of stipulation documents required from the applicant. The generated transaction application can be electronically transferred to the host site 110, and the document classification system 200 therein, via the dealer/lender interface processing module 210. In an example embodiment, an HTTP POST can be used to transfer the transaction application to the host site 110. The host site 110 can validate the transaction application for the particular applicant received from the dealer/lender platform 120. The host site 110 can also parse the transaction application to identify the list of stipulation documents required from the applicant. The host site 110, and the document classification system 200 therein, can also electronically transmit the list of required stipulation documents to the particular applicant at a corresponding applicant platform 130. The applicant interface processing module 220 can be used to transmit the validated transaction application with the list of required stipulation documents to the particular applicant. In the example embodiment, the list of required stipulation documents can be transmitted to the particular applicant as one or more SMS messages, which can be received by the applicant via a mobile device of the applicant platform 130. This feature of the example embodiment improves the technology by enabling the particular applicant to interact with the dealer/lender using a convenient mobile device, instead of a desktop computer or other less convenient platform. The applicant can upload the requested stipulation documents identified in the list of required stipulation documents to the host site 110. The stipulation documents can be imaged by the applicant using a camera of the applicant's mobile device. This feature of the example embodiment improves the technology by enabling the particular applicant to produce electronically transferable stipulation documents using a convenient mobile device camera, instead of having to attach documents to an email or use postal mail. Once the stipulation documents, or a portion thereof, are uploaded to the host site 110 by the applicant in response to the SMS message, the host site 110 can perform a set of document analysis, classification, and validation operations on the uploaded documents to, for example: check for document type, format, corruption, malware, and association with the particular applicant; determine compliance between the requested documents and the received documents; and identify any requested documents that were not received. Additional stipulation document analysis, classification, and verification techniques used in an example embodiment are described in more detail below. If the host site 110 is able to verify one or more of the uploaded stipulation documents, a link to each verified stipulation document, or a single link to a group of verified stipulation documents, can be sent to the dealer/lender at the dealer/lender platform 120 with an HTTP webhook, a link, or unique identifier of the validated stipulation document(s) received from the applicant. The dealer/lender interface processing module 210 at the dealer/lender platform 120 can receive the validated stipulation document link(s) from the host site 110. The dealer/lender interface processing module 210 can use the link(s) to fetch the validated stipulation document(s) and associate the received stipulation documents with the transaction application generated for the particular applicant. The dealer/lender interface processing module 210 can also send an acknowledgement back to the host site 110 indicating that the verified stipulation document(s) have been received.

If the host site 110 is unable to verify one or more of the uploaded stipulation documents, the host site 110 can update a webpage on the user interface of the applicant platform 130 to indicate that one or more of the uploaded stipulation documents were invalid or non-verifiable. In an alternative embodiment, an SMS message can be sent by the host site 110 to the applicant via a mobile device of the applicant platform 130 to indicate that one or more of the uploaded stipulation documents were invalid or non-verifiable. The process can continue until all of the requested stipulation documents for an applicant's transaction application have been received from the applicant and all documents have been verified by the host site 110. The host site 110 can periodically send reminders to the particular applicant as one or more SMS messages, which can be received by the applicant via a mobile device of the applicant platform 130. The reminders are used to prompt the applicant to upload the requested stipulation documents for the applicant's transaction application.

The dealer/lender can use a dealer/lender platform 120 to update a transaction application for a particular applicant. The updated transaction application can be electronically transferred to the host site 110, and the document classification system 200 therein, via the dealer/lender interface processing module 210. In a manner similar to the operations described above, the host site 110 can validate the updated transaction application for the particular applicant received from the dealer/lender platform 120. The host site 110 can parse the updated transaction application to identify any additional stipulation documents required from the applicant. As described above, the host site 110 can prompt the applicant to upload the additionally requested stipulation documents for the updated transaction application. As a result, the dealer/lender at a dealer/lender platform 120 can use host site 110, and the document classification system 200 therein, to request and obtain verified stipulation documents for a transaction from a particular applicant using a completely automated and network enabled process. These features of the example embodiments improve the technology by substantially increasing the speed and accuracy by which verified stipulation documents can be obtained from an applicant with electronic means. This serves to enable the completion of transactions between the dealer/lender and the applicant in a much more efficient and timely manner.

An example embodiment provides a system and method whereby an applicant receiving a personalized link on behalf of a dealer and/or lender may open the personalized link using their the web browser of their mobile device to: 1) see which stipulation documents and/or images the dealer and/or lender is requesting the applicant provide to satisfy stipulations pertaining to their transaction (e.g., a loan application), 2) review the dealer and/or lender's legal notices and consents, 3) verify their identity, 4) use the camera on their mobile device or the file system's browsing capabilities within the web browser of their mobile device to capture or obtain images of the requested stipulation documents, and 5) upload the stipulation documents/images requested by the dealer and/or lender for access by the dealer and/or lender in completing a transaction. In an example embodiment, the stipulation documents may include, but are not limited to, Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™

Bookout Sheets, NADA™ Bookout Sheets, GAP Waiver Contracts, Vehicle Service Contracts, or Credit Life Disability Insurance Contracts.

An example embodiment provides a system and method whereby images of stipulation documents (uploaded by applicants who receive document request messages on behalf of dealers and/or lenders as described above) are transferred over the network 115 using protocols such as HTTP, FTP, and the like to a cloud-based computing cluster, such as host site 110, where the contents of the uploaded stipulation documents are analyzed using a variety of image processing techniques, including optical character recognition and the application of machine learning models. The host site 110, and the applicant interface processing module 220 therein, can perform image processing operations, such as image map reduction tasks to process the image's pixels in parallel while storing the color of each pixel, the proximity of contrasting colored pixels, and the positions, alignments, and densities of similar-colored pixels. The image processing results can be compared to handwritten and typeface representations of Unicode characters to classify text in the image. In addition to extracting document text, the image's pixels can be compared to patterns often found in documents related to particular transactions (e.g., loans). These patterns can include facial images, electronic or handwritten signatures, rounded corners, watermarks, background designs, barcodes, logos, etc. These patterns can be analyzed using well-known machine learning systems such as convolutional neural nets (CNNs), bi-directional Long Short-Term Memory (LSTMs), Connectionist Temporal Classification (CTC), Support Vector Machines (SVMs), etc. to search for commonalities between structured and unstructured data sets. Documents exhibiting similar features can be grouped together and classified by their type (such as Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™ Bookout Sheets, NADA™ Bookout Sheets, GAP Waiver Contracts, Vehicle Service Contracts, or Credit Life Disability Insurance Contracts). Given the document type as determined by the image processing analysis as described above, the structure of the document can be determined by the document type. Based on the document type and structure, text or other structured information can be extracted from the document and then further classified into names, dates, physical addresses, phone numbers, email addresses, identification numbers, organizations, municipalities, currencies, legalese, restrictions, page numbers, document page count, etc. based on the text patterns and features (including formats and layouts) commonly found in these document types.

Some features or elements of a document can be classified even further based on information found in the transaction application. For example, a date found on a document image that is statistically similar to government-issued photo IDs may be classified as the applicant's date of birth, the document's issue date, or the document's expiration date. An example embodiment can perform statistical classifications based on considering factors such as: 1) the time difference of each date compared to each other, 2) the current date, and 3) the applicant's date of birth as listed on their transaction application. An example embodiment can classify a future date (e.g., one that exceeds the current date) as most likely to be the document's expiration date. An example embodiment can classify the date that is identical to what the applicant specified as their date of birth as a birth date. An example embodiment can classify the date between the applicant's date of birth and the document's expiration date as most likely to be the document's issue date. Alternatively, dates extracted from a document image that is statistically similar to a retail installment sales contract may be classified as the date when a portion of the contract was agreed to, the date when the first payment is due, or the date when the final payment is due. As yet another example, dates extracted from a document image that are statistically similar to a paystub may be classified as the pay period's begin date, the pay period's end date, the date when the applicant was paid, the date when the applicant began employment, the date when the document was printed, etc.

An example embodiment can also classify text and features of documents based on their legal implications. For example, extracted text pertaining to commonly classified consents, waivers, notices, disclaimers, or clauses may be used to automate consumer contact, access the consumer's credit report, initiate a verification of employment, trigger marketing solicitations, and/or adjust the prioritization of resources. The presence of recognized language or text in a credit application document/image, paired with a date and a signature closely resembling what is found on a government-issued photo ID matching the applicant's name, is used by the example embodiment to indicate that the applicant's phone number listed on their credit application may be sent a text message for the purpose of collecting documents/images to satisfy stipulations. As such, the example embodiment can automatically obtain applicant consents and waivers based on the document analysis as described above. This consent and/or waiver language permits the dealer and/or the lender to text message the applicant to collect the remaining required stipulation documents to commence servicing of the loan.

An example embodiment provides a system and method to identify and surface discrepancies and/or deficiencies found in stipulation documents that may prevent the stipulation documents from satisfying required stipulations as soon as they are uploaded. An example embodiment can statistically classify the uploaded document/image as a particular type of document as described above. Once the document type is determined, the example embodiment can compare the document type with the requested stipulation document. If the uploaded document/image is of a different type than what was requested (based on statistical analysis of the document features), the example embodiment can immediately generate and display an error message to the applicant via the applicant platform 130 before the document/image is submitted to the dealer and/or lender. For example, if an applicant, a dealer, and/or a lender personnel is prompted to snap pictures and upload a paystub, but the applicant uploads a bank statement instead, the example embodiment can detect this discrepancy and generate for display an error message. If the document/image uploaded by the individual is of the same type as what was requested (based on statistical analysis of features), the example embodiment can also determine if certain expected features of the uploaded document are missing or are not statistically similar to information from the transaction application. If this discrepancy is detected, the example embodiment can generate and display an error message to the individual via the applicant platform 130 before the document/image is submitted to the dealer and/or lender. For example, applicants who upload a paystub when prompted to do so may still receive an error message if: 1) the paystub document/image does not reference the applicant's name or may reference a different applicant's name (for example, "Jo Boren Sr." rather than "Jo Boren"), 2) the paystub document/image specifies a pay date that is not recent (for example, more than 45 days may have elapsed between the date when the transaction application was approved and when the paystub was dated), 3) the earnings stated in the paystub document/image do not support or are not consistent with the applicant's gross annual income, 4) the paystub was issued by an employer that is different from what the applicant specified in their transaction application, or 5) the paystub shares features that are statistically similar to those found in fraudulent paystubs (for example, alignments, spacing, typos, calculations, logos, watermarks, and layouts on the paystub are statistically similar to those from paystubs deemed to be fraudulent).

An example embodiment provides a system and method to enable the secure handling and transfer of stipulation documents/images uploaded to the dealer or lender at a dealer/lender platform 120 (or computing system that the dealer and/or lender contracts with) via the host site 110. Additionally, the example embodiment provides a system and method to enable the secure handling and transfer of information extracted from the uploaded stipulation documents for the purpose of evaluating whether or not to complete a transaction (e.g., fund a loan). The secure transfer of stipulation documents/images and the extracted information can be implemented using network protocols such as HTTP, FTP, SMTP, etc. whereby information, that may be encrypted using SSL/TLS, is exchanged in a variety of formats (including, but not limited to, XML and JSON formats). An example embodiment can transfer documents/images, along with extracted information pertaining to the documents/images, back to the dealer or lender at a dealer/lender platform 120 via the host site 110 for indirect and direct transactions (e.g., auto lending). The example embodiments can also be configured to notify the dealer and/or lender that a stipulation document has been uploaded by an applicant that is likely to satisfy a stipulation for a particular transaction.

Document Classification Processing Pipeline

Figure 3:
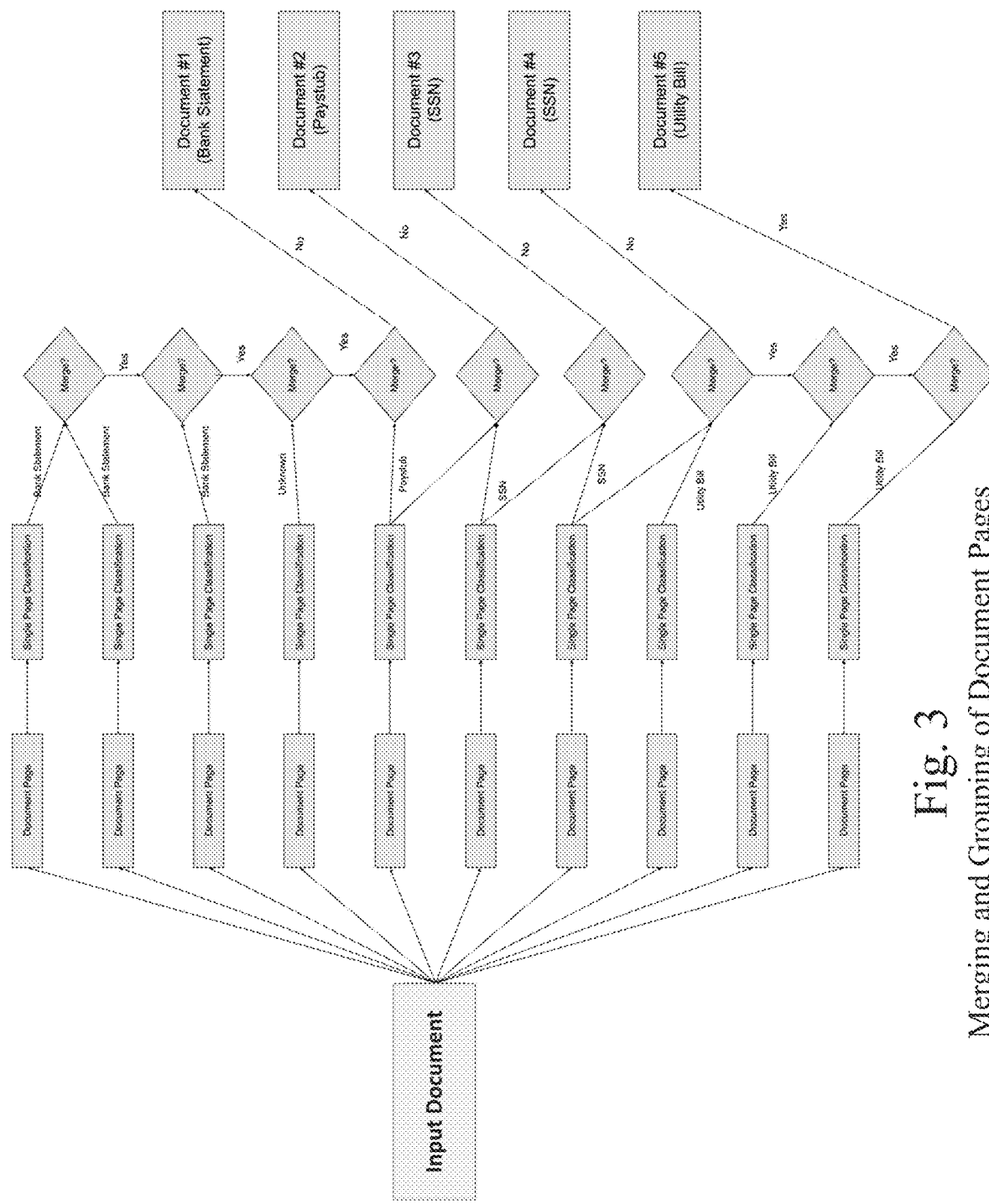
FIG. 3 illustrates a processing flow diagram that shows an example embodiment of a method for merging and grouping document pages as described herein.
Figure 4:
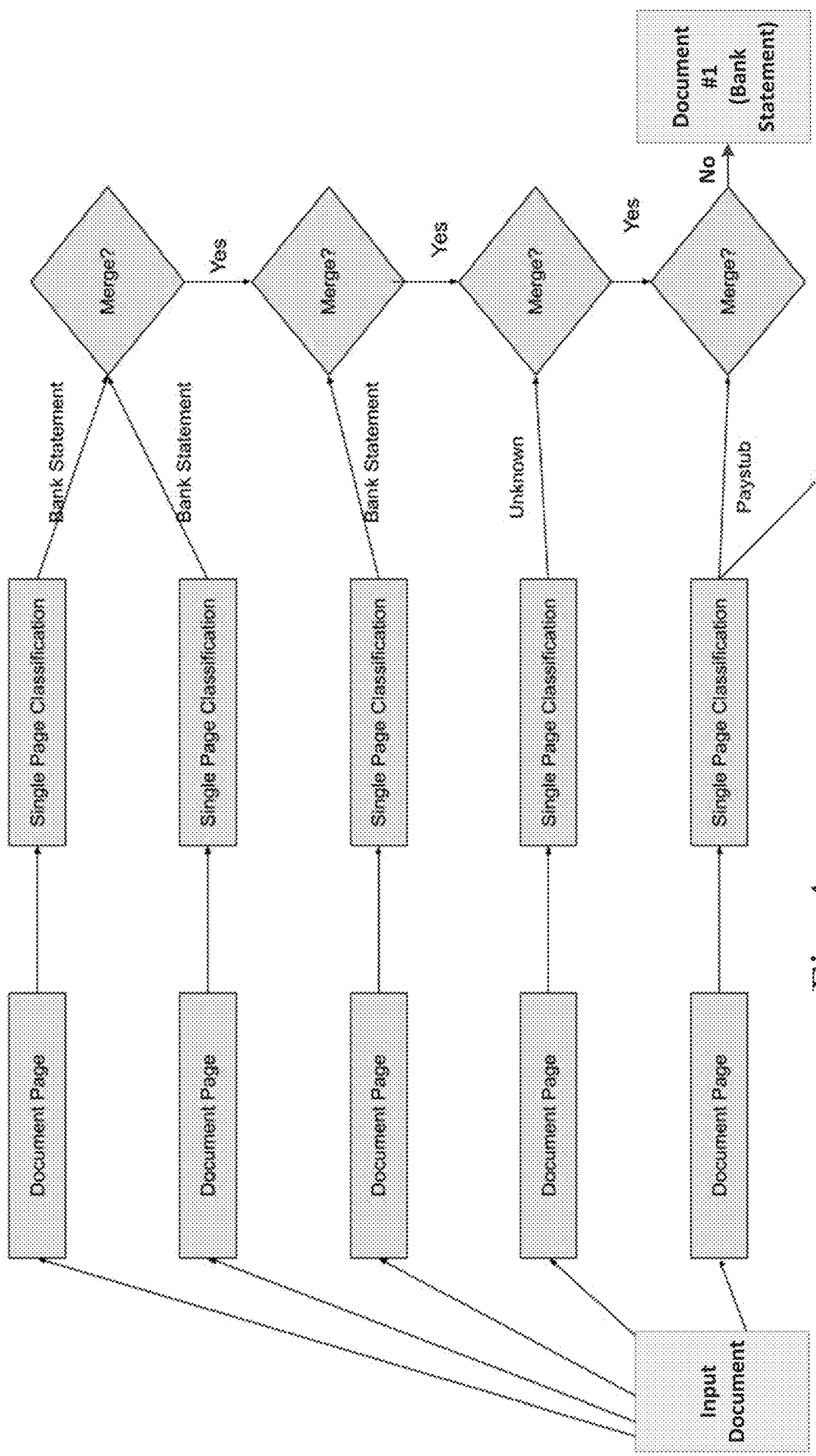
FIGS. 4 through 6 illustrate detailed portions of the processing flow diagram as shown in FIG. 3.
Figure 5:
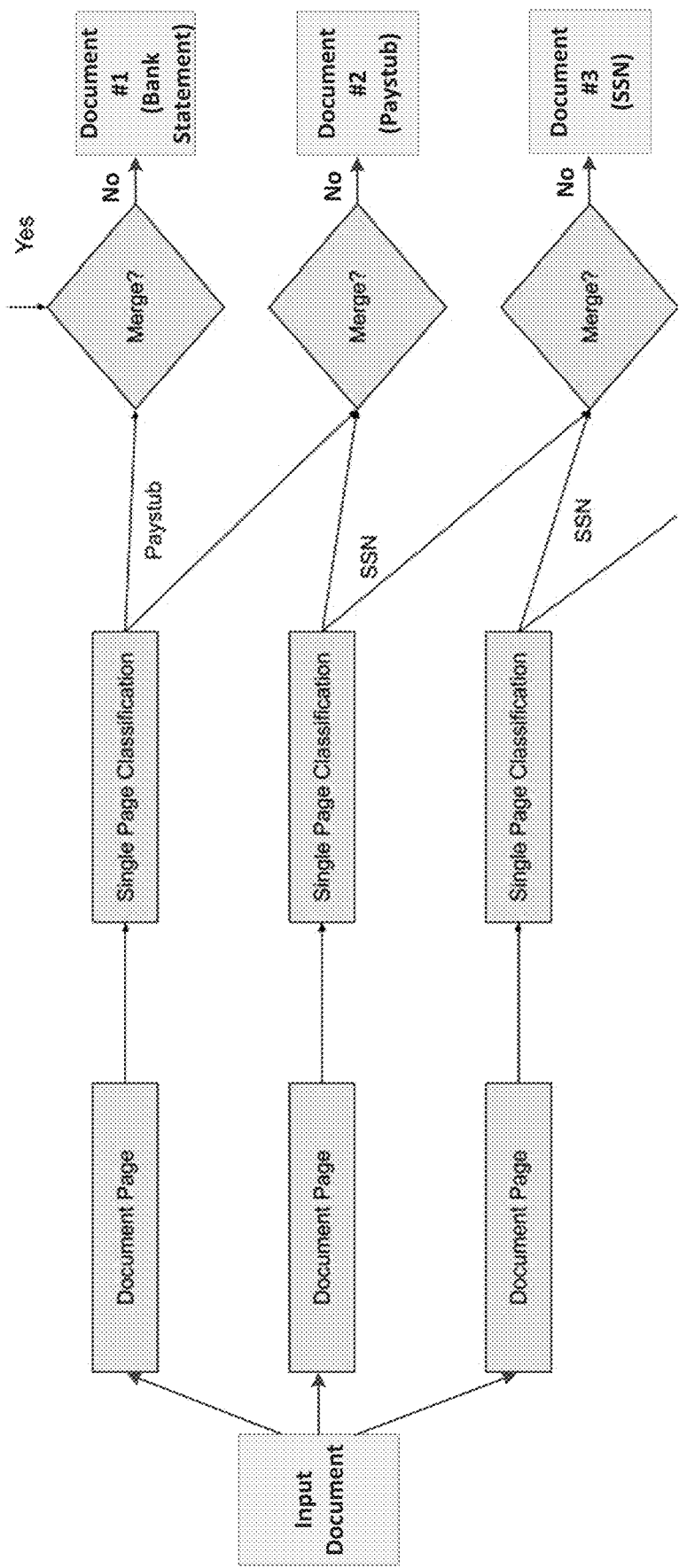
Figure 6:
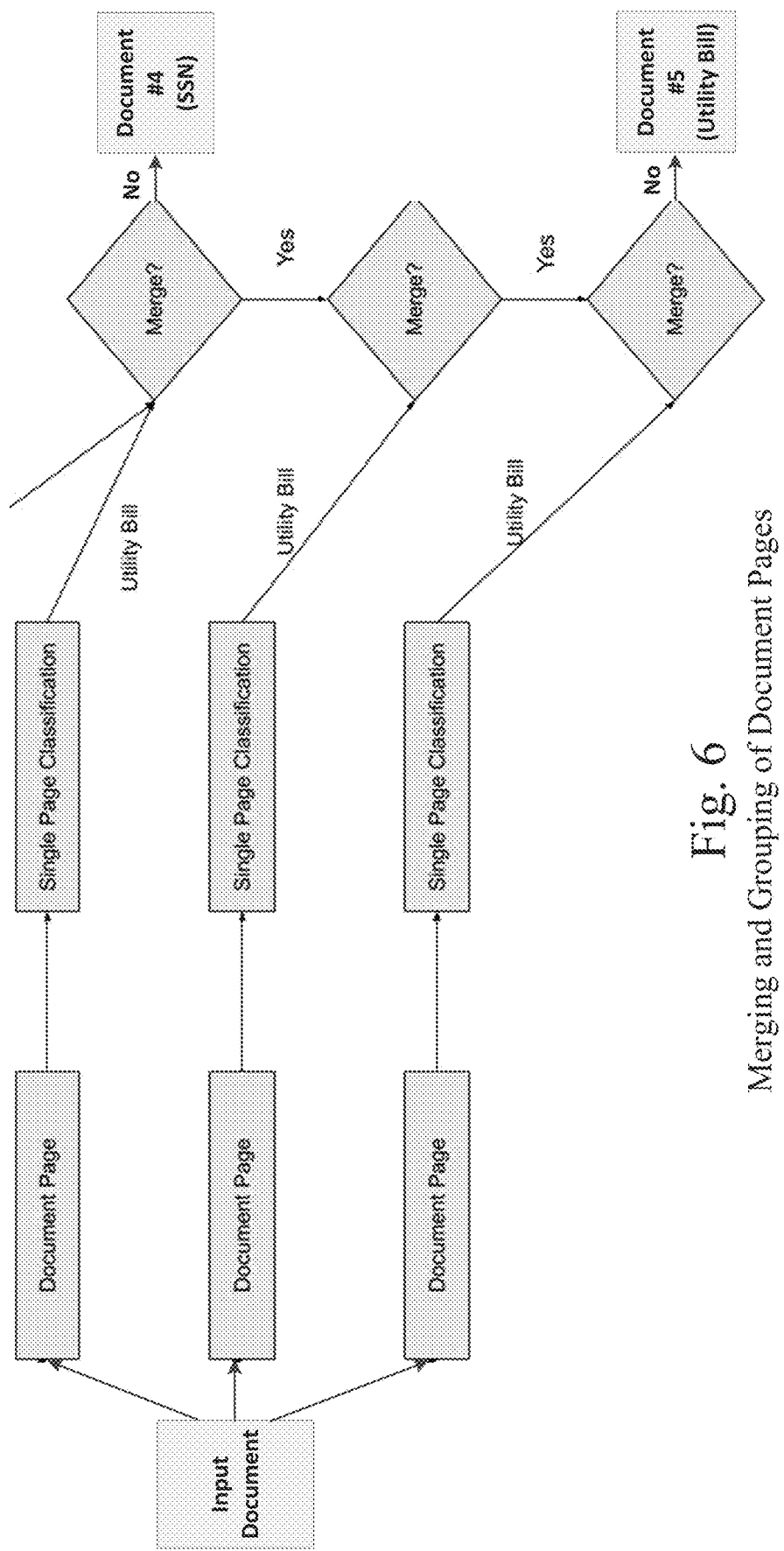

As part of the system and method for domain aware document classification and processing as disclosed herein, a Document Classification Processing Pipeline, implemented by the document classification processing module 230, is provided to process, classify, and organize documents (e.g., stipulation documents from an applicant). FIGS. 2 through 6 illustrate processing flow diagrams showing the processing workflows used in the Document Classification Processing Pipeline of an example embodiment. FIG. 2 illustrates a processing flow diagram that shows an example embodiment of a method for classifying a single page document. FIG. 3 illustrates a processing flow diagram that shows an example embodiment of a method for merging and grouping document pages. FIGS. 4 through 6 illustrate detailed portions of the processing flow diagram as shown in FIG. 3. Each of these flow diagrams of an example embodiment of the Document Classification Processing Pipeline is described below.

As described above, there are various ways provided to receive a document (e.g., a stipulation document) from an applicant, a dealer/lender, a financial institution, or other document sources. When these raw input files or documents are received in an input stream, the document classification processing module 230 typically doesn't have any information about the received input files or documents. For example, there may be no information regarding the type, structure, content, format, or source of the input file or document. Initially, the input document is fed to a pre-processing module, which splits every page of the document and applies text and image analysis processes to generate text using OCR for every page. The document pre-processing (image and text) module is described in more detail below.

Referring to FIG. 2, the document classification processing module 230 now has an image and text representation for every page of the input document. As shown in FIG. 2, the document classification processing module 230 starts off by sending each and every page of the input document through the single page document classification pipeline. For each page of the input document, the document classification processing module 230 uses a decision tree to classify the page based on, for example: usage of the image classifier or text classifier, presence of multiple documents on a single page, sub-category classification, etc. After executing the entire pipeline of single page document as shown in FIG. 2, the document classification processing module 230 can determine a document type corresponding to each and every page of the input document. Some of these pages might have a type as 'unknown', which means that the single page document pipeline shown in FIG. 2 wasn't able to determine the document type present on the page.

Referring now to FIGS. 3 through 6, given the document types determined at the page level as described above, the document classification processing module 230 can use the processing workflow shown in FIGS. 3 through 6 to iterate over the document from the page to page to determine if each page should be merged with a previous page or determine if a current page should be part of a new document. The document classification processing module 230 can make this determination for all the pages iteratively. The document classification processing module 230 can use trained machine learning classifiers and domain-specific knowledge-based rules that evolve over time to effectively perform the page merging operation with a high level of accuracy.

Document Pre-Processing (Image and Text)

Given the received raw input files or documents, the document classification processing module 230 can perform various image processing tasks to make the document more digitally readable (e.g., deblur, rotate, deskew, denoise, resize, etc.). The document classification processing module 230 can run an OCR process on the document page and obtain any text from the image. The document classification processing module 230 can also run text pre-processing tasks like domain-based contextual spell correction and contextual grouping of logical tokens. A domain-inspired rules engine can be configured to work with the OCR module and smartly attempt to overcome the limitations of OCR. As a result, the document classification processing module 230 can overcome the limitations of standard classification on scanned images by using these techniques.

Classification by Text

Most of the pages of the raw input documents can be differentiated from each other by analysis of the text in the document. For example, the text content present on a paystub is very different as compared to the text content present on an insurance bill. Although most pages of the raw input documents can be differentiated solely based on text content, there are other documents like government identity cards, social security cards, passports, etc., which do not have enough text content to make a clear determination of document type. For these cases, the document classification processing module 230 can use a combination of the amount of text present on the document, and domain knowledge of keywords to make a determination of document type. In these cases, the documents can be "classifiable by text" documents. For example, even though insurance cards don't contain much text, the document classification processing module 230 can classify these types of documents based on the text content.

Hierarchical Text Document Classifier

Document pages that are "classifiable by text" can be processed by a text document classifier. The text classifier can take a string of text from the document page as an input and return a probability score corresponding to a document type. This score can be denoted as a confidence score. The text document classifier can use a standard fastText classifier and train the classifier with a corpus of training text. The trained classifier can be trained on our data keeping the embeddings the same. The text document classifier can be trained using a dataset representing a variety of document types, and some random documents to train for an 'unknown' document category.

In an example embodiment, the document classification processing module 230 can use multiple text document classifiers organized in a tree form. Each different text document classifier can be configured for a particular domain (e.g., consumer loans, auto-loans, mortgages, etc.). Once the domain of a page is determined using the techniques described above, a particular corresponding domain-specific text document classifier can be used to further process the page.

Identifying Bounds of a Document or File

Most documents span an entire page or multiple pages; although, there are certain types of documents that are smaller in size and multiple documents can be present on a single page. For example, a government-issued driver's license along with an insurance identity card photocopied on the same page is a common occurrence. There are other document types, like social security cards, passports, etc., which are small enough to fit on a fraction of a page. Because these documents are small, the amount of text in the document is minimal. In this case, the document classification processing module 230 can use an image-based object detection model to identify and classify these types of documents. In an example embodiment, the document classification processing module 230 can use a standard YOLO V3 model, which is trained on these particular document types and has been fine-tuned to detect various aspect ratios. The document classification processing module 230 has also been configured with augmented data (e.g., rotation, skew, noise, etc.) to make the model classify these document types, even if the images are slightly off. The model takes in an image of the page and returns the bounds of various documents present on the page. The model also returns the type of the document along with bounding boxes, which can be verified in the later stages. The particular differentiated documents on the page can be cropped out into smaller documents to be treated individually.

In some cases, it may be necessary to redact all the customer information from the document or page. To achieve this, the document classification processing module 230 can send as input the public URL of the document that needs to be redacted along with all the words present in that document (including the spatial location of each word within the image—bounds). Using the bounds of the words present, the document classification processing module 230 can shuffle the pixels inside the bounds to generate the redacted image.

Identifying Multiple Documents in a Single Page (MDSP)

Many times, the stipulation pages received by a lender contain a single document. But, if we were to directly send this page to our object detection model, we run the risk of incorrectly identifying various sections in the document as separate documents. For example, in a file containing a single paystub, it is very common for the "Current Earnings" section to be at the top of the file whereas the "Year to Date Earnings" section will be at the bottom of the same file. It's easy for any object detection model to confuse these sections as separate paystubs. To solve this problem, the document classification processing module 230 is configured with a trained text-based model that detects if the input page contains more than one document. The model takes in the text of the page as an input and returns a Boolean value representing whether the text is from multiple documents or just one document. Because there can be multiple documents present on a single page, there may be a minimal amount of text in the document. In this case, the model is configured to normalize the words that might change, like name, age, dates, etc. The text can be processed before sending the text to the model by replacing these entities with a custom notation (_dollar_, _date_, etc.). The model can be trained for custom embedding for this use case, as our vocabulary size is really small, and we want to take advantage of that. We can train fastText embeddings on our processed data and use a deep Bidirectional Long Short-Term Memory (LSTM) model to predict if there are multiple documents.

Pixel/Image-Based Document Classifier

There are some documents, which do not have enough text on them to effectively determine a document type based on text content (e.g., social security cards, driver's licenses, etc.). Given the quality of documents, it is sometimes difficult to classify these documents based on text. To overcome this problem, the document classification processing module 230 can be configured with a trained deep learning pixel-based model (e.g., MxNet) with equal sample sizes of the different document types the model is trained to detect. To avoid enabling the model to incorrectly classify documents, the deep learning pixel-based model is also trained with miscellaneous "other" documents. This model is trained and fine-tuned with a custom set of documents that covers all the use-cases we want to be identified. This model also associates a confidence score with each document type.

Domain Based Classifier

There are certain types of documents that are very similar to each other, which a generic text-based classification model can't distinguish. For example, in credit card statements and bank statements, most of the text in these documents is indistinguishable. In an example embodiment, a domain-based classifier or extraction can be used to classify these documents. For example, the domain-based knowledge of a type or structure of an account number can be used to classify a bank statement as differentiated from a credit card statement. This domain-based classifier can also act as a sanity checker. The domain-based classifier can be used to cross check a classification determined by other processes.

Page Merging

After the document classification processing module 230 has run all the individual input pages through the single page classification pipeline as shown in FIG. 2 and described above, the document classification processing module 230 has determined a document type for every page in the input stream and assigned a corresponding confidence score to the document type determination for each page. In an example embodiment, the next step is to use this information to determine how individual pages need to be merged with each other. For example, the document classification processing module 230 needs to identify if a particular page belongs to a prior page or if the page is the start of a new document. There are various different scenarios that may be encountered when attempting to merge pages of a document. These various different scenarios as handled by the document classification processing module 230 are described in detail below.

Example Scenarios of Page Merging: Scenario #1

The simplest page merging scenario is encountered when every document is a single page document and every occurrence of the same document type is not one after the other. For example, a set of document pages may include: a driver's license, social security card, paystub, another driver's license, another paystub, etc., wherein each document is on a single page. In this case, none of the page document types will match the document type of the preceding page. Thus, in this scenario, the document classification processing module 230 can process each page as a separate document that does not need to be merged with the preceding page.

Example Scenarios of Page Merging: Scenario #2

The slightly more complicated scenario is when there are two or more pages belonging to the same document where the pages are in sequential placement, one after the other. For example, a set of document pages may include: a paystub, bank statement (page A), bank statement (page B), bank statement (page C), driver's license, driver's license, etc., wherein each document is on a single page. In this example, the document classification processing module 230 can determine that Page 2 (bank statement—page A) should not be merged with Page 1 (Paystub); because the pages belong to different document types. In this case, the document classification processing module 230 can conclude that Page 1 is a separate standalone document, whereas Page 2 is the first page of a new bank statement. The document classification processing module 230 can determine that Page 3 (bank statement—page B) should be merged with Page 2 (bank statement—page A); because, the pages are classified with the same document type. Similarly, the document classification processing module 230 can determine that Page 4 (bank statement—page C) should be merged with Page 3 (bank statement—page B); because, the pages are also classified with the same document type. The document classification processing module 230 can also determine that Page 5 (driver's license) should not be merged with Page 4 (bank statement—page C); because the pages belong to different document types. At this point, the document classification processing module 230 can determine that Page 2 (bank statement—page A), Page 3 (bank statement—page B), and Page 4 (bank statement—page C) belong to the same bank statement and can be merged. Because the example embodiment can use domain inspired rules, the document classification processing module 230 can determine that driver's license pages should not be merged; because, driver's licenses are always single page documents. As such, each driver's license page is treated as a separate document. The domain knowledge inspired processing engine of example embodiments has various such domain-based rules, which can affect other scenarios. Thus, in this scenario, the document classification processing module 230 can process each page as a separate document until a document type of a page matches a document type of the preceding page. In this case, the pages with the matching document type can be merged as a multiple page single document.

Example Scenarios of Page Merging: Scenario #3

The next more complicated scenario is very similar to the scenario above, except that an unknown page is encountered in the input file/page stream. An unknown page is a page that the document classification processing module 230 was not able to identify as being any of the known document types. For example, a set of document pages may include: a paystub, bank statement, bank statement, unknown, driver's license, driver's license. If the document classification processing module 230 were to follow the merging logic from Scenario #2 as described above, the document classification processing module 230 would produce five separate documents: paystub (page 1), bank statement (pages 2, 3), unknown (page 4), driver's license (page 5) and driver's license (page 6). Based on heuristics and a deep level of domain knowledge, we know that even though Page 4 is unknown, the page is likely part of the bank statement. After analyzing hundreds of such examples, we have identified that sometimes the last page of the bank statement doesn't have enough content to be classified as an individual document type. Hence, the document classification processing module 230 can be configured to use domain knowledge to learn to look for specific keywords in the unknown page. In this case, the document classification processing module 230 can be configured to check for keywords, which will help to determine if the unknown page is actually part of the bank statement by looking for relevant keywords. If the document classification processing module 230 determines that the unknown page is actually part of the bank statement, then the document classification processing module 230 can merge the unknown page with the previous page and report that the bank statement contains three pages (2, 3, and 4).

Similar situations sometimes occur for the first page of a new document. Summary pages, or cover pages can produce the same issue. In an example embodiment, the document classification processing module 230 can be configured with added domain-specific knowledge rules for all these cases to facilitate merging these pages correctly. If the unknown page appeared before or after a known single page document, the document classification processing module 230 can be configured to not merge the two pages together.

Example Scenarios of Page Merging: Scenario #4

The even more complicated scenario occurs when there are two or more multi-page documents that appear one after the other (e.g., bank statements for the last three months). For example, a set of document pages may include: bank statement, bank statement, bank statement, bank statement, bank statement, unknown, paystub. If the document classification processing module 230 were to follow the logic from the previous scenario described above, the document classification processing module 230 would produce two documents: Bank Statement (Pages 1-6) and Paystub (Page 7). However, it is possible that Pages 1-6 may belong to two separate bank statements. For example, Pages 1, 2, 3 may belong to the January bank statement, whereas Pages 4, 5, 6 may belong to the February statement. So far, the only information the document classification processing module 230 has used is the document classification types for each of the pages. However, the use of only the document classification type for this scenario may not be enough to correctly merge/split the two bank statements representing different time periods.

To correctly process pages received in this scenario, the document classification processing module 230 is configured to combine the page/document classification result with an entity extraction strategy to determine the time period corresponding to each of those bank statements and realize that Page 4 may be the start of a new month, hence a new bank statement. In particular, the document classification processing module 230 can be configured to extract the dates or other time information from each bank statement page. Based on an analysis of this extracted time information, the document classification processing module 230 can determine overlapping dates on the pages and appropriately merge or split the pages into the proper bank statements.

A small variation of this domain-specific process can also include a scenario wherein the two bank statements belong to the same month, but are for two separate bank accounts. In these cases, the document classification processing module 230 can be configured to extract the bank account number from the bank statements and to merge or split the two bank statements correctly. Use of domain knowledge inspired rules in the document classification processing module 230 can facilitate the processing of pages corresponding to a variety of document types and scenarios. These domain-specific knowledge rules enable the system to merge or split pages appropriately based on different factors possible for a certain document type.

Example Scenarios of Page Merging: Scenario #5

This scenario is similar to Scenario #4; except, the problem is a lot more complicated to solve. Scenario #4 dealt with documents that are known to be multiple pages appearing one after the other. However, there are certain documents that are most commonly single page documents, but in rare cases can be two or sometimes even three pages. A common example in the consumer document space is a paystub. For example, a set of document pages may include: paystub, paystub, driver's license, social security card. If the back to back pages of the same document type belonged to a known single page document, then it is straightforward to not merge the pages together and treat them as separate documents. Similarly, if the back to back pages of the same document type belonged to a known multi-page document, then it is straightforward to just merge the pages together and treat them as a single document. However, with a document type like a paystub, it is not clear if the document type is always a single page document or always a multi-page document. In these cases, it is much harder to know if the two or more pages of these document types belong to the same or different paystubs.

To solve the problem described for this scenario, the document classification processing module 230 of an example embodiment can be configured with a special machine learning classification model that has been trained with many examples of single page paystubs and multi-page paystubs (or other document types that are not always a single page document or not always a multi-page document). This classification model helps to determine if the two consecutive pages of paystubs are two separate paystubs or part of the same paystub.

Inferences and Predictions

As described above, the document classification processing module 230 can be configured to use artificial intelligence and domain-specific knowledge to classify and merge pages of a set of input documents. In a further extension of these features of an example embodiment, the document classification processing module 230 can be further enhanced to infer or predict results related to pages of an input set of documents when the classification processes described above cannot produce definite results.

In a first inference extension of an example embodiment, the document classification processing module 230 can be further configured to use the presence of documents and/or their corresponding information to validate information on other documents associated with the same loan application or to infer information from other documents associated with the same loan application. For example, if a loan applicant submits three paystubs and one of the paystubs is difficult to read, the document classification processing module 230 can be configured to use the other two paystubs from the same applicant's loan application to make a reasonable prediction of the content of the unreadable third paystub. Furthermore, the presence or detection of a particular document in an input set of pages can be used to bias the document classification processing module 230 into being more likely to produce a particular inferred result. For example, if an applicant's driver's license has already been detected by the document classification processing module 230, it is unlikely that another document in the input set of pages is a driver's license belonging to the same applicant. It is much more likely that a marginally readable document is either a driver's license belonging to a different applicant or not a driver's license at all, but some other required document type, such as a social security card. Thus, the document classification processing module 230 can be configured to be less likely to classify the marginally readable document as the same applicant's driver's license and more likely to classify the marginally readable document as a different type of document or a driver's license of another applicant.

In a second inference extension of an example embodiment, the document classification processing module 230 can be further configured to use the applicant-stated information to make predictions regarding a document's classification or an entity's value. For example, if an unclassified document related to a particular applicant lists the applicant's employer's name, which matches the employer name the applicant stated on his/her application, it is unlikely that the document is a driver's license or another form of government identification (ID). These government ID documents would be unlikely to list the applicant's employer. It is much more likely for the unclassified document to be a paystub or a bank statement. If the unclassified document also lists the last four digits of the applicant's social security number (SSN), which matches the SSN the applicant had stated on his/her credit application, and the applicant's occupation is matched with the occupation stated on or closely related to his/her credit application, the unclassified document is more likely to be a paystub rather than a bank statement. The document classification processing module 230 can be configured with a domain-specific knowledge bias or weight to be more likely to produce these particular inferred results based on other known information or documents. Therefore, the use of applicant-stated information can be used as part of a document classification process to inform the outcome.

In a third inference extension of an example embodiment, the document classification processing module 230 can be further configured to use the approval terms of a loan application to make predictions regarding a document's classification. For example, if lender approval of a loan application is based on the applicant proving their income, the document classification processing module 230 can be weighted towards assuming that any unknown documents are likely to be income-related documents. It will be apparent to those of ordinary skill in the art in view of the disclosure herein that other equivalent inference or prediction features of various embodiments are enabled by the systems and methods disclosed herein.

Figure 7:
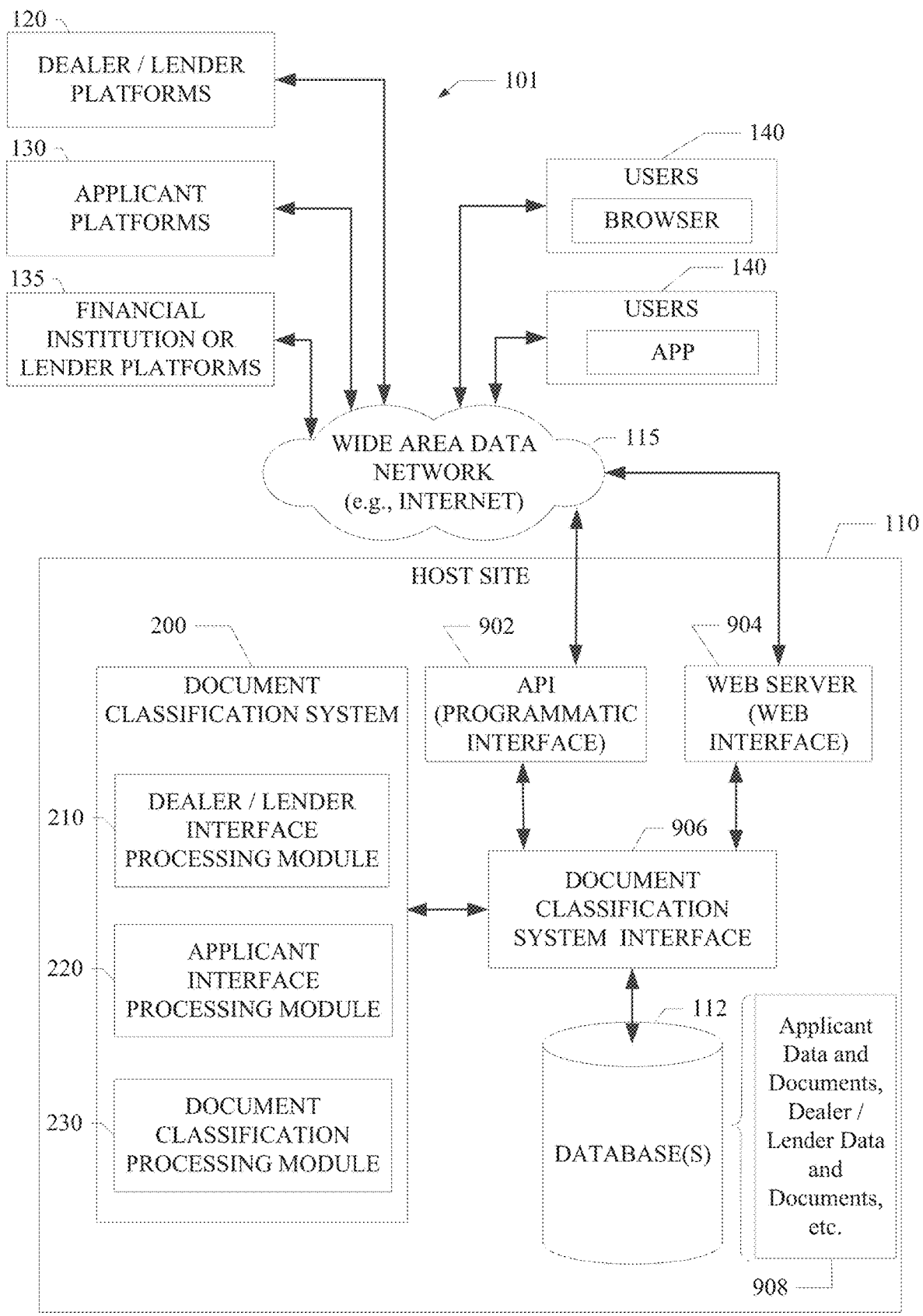
FIG. 7 illustrates another example embodiment of a networked system in which various embodiments may operate.

Referring now to FIG. 7, another example embodiment 101 of a networked system in which various embodiments may operate is illustrated. In the embodiment illustrated, the host site 110 is shown to include the document classification system 200. The document classification system 200 is shown to include the dealer/lender interface processing module 210, the applicant interface processing module 220, and the document classification processing module 230 as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the document classification system 200 either directly or via an interface 906. The document classification system 200 may be configured to access a data storage device 112 either directly or via the interface 906.

Figure 8:
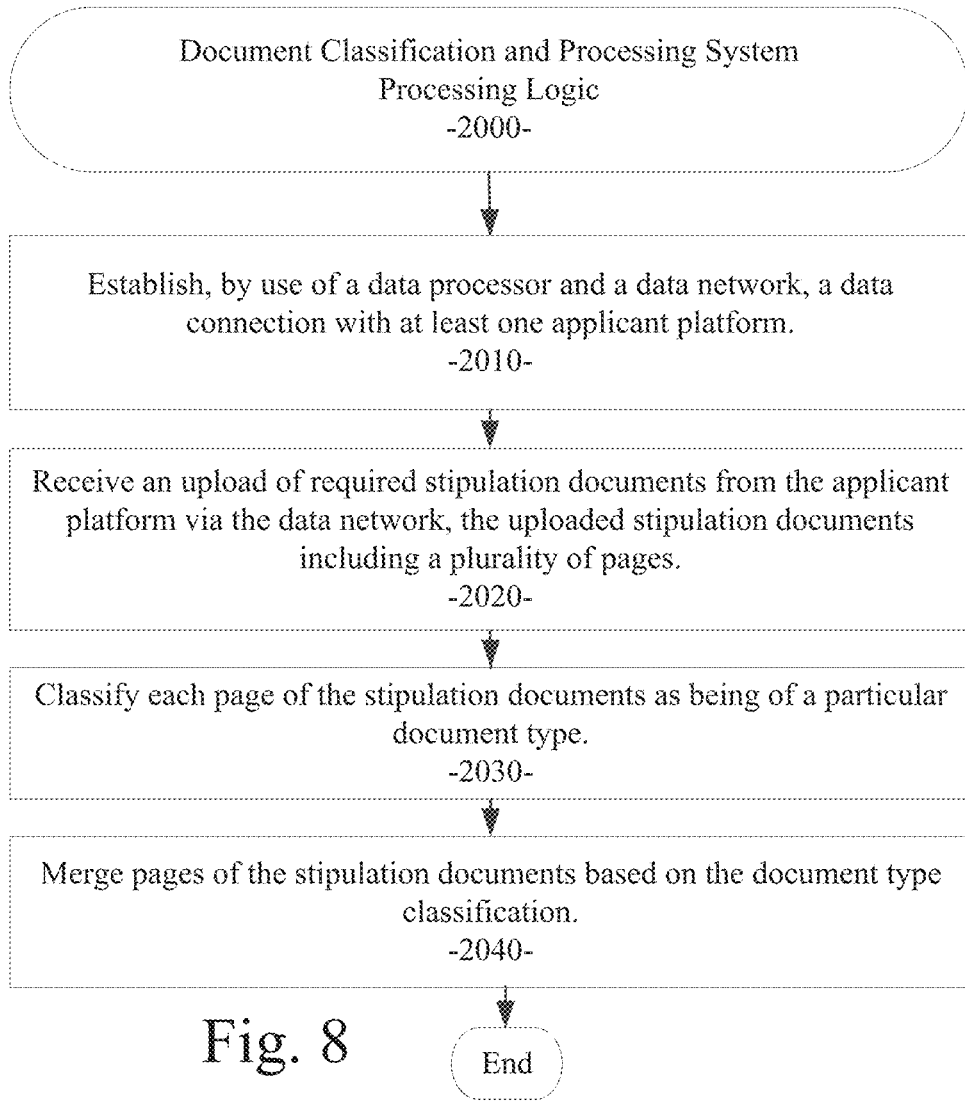
FIG. 8 illustrates a processing flow diagram that illustrates an example embodiment of a method as described herein.

Referring now to FIG. 8, a processing flow diagram illustrates an example embodiment of a method implemented by the document classification system 200 as described herein. The method 2000 of an example embodiment includes: establishing, by use of a data processor and a data network, a data connection with at least one applicant platform (processing block 2010); receiving an upload of required stipulation documents from the applicant platform via the data network, the uploaded stipulation documents including a plurality of pages (processing block 2020); classifying each page of the stipulation documents as being of a particular document type (processing block 2030); and merging pages of the stipulation documents based on the document type classification (processing block 2040).

Information Extraction Processing Pipeline

An example embodiment of the document classification and information extraction system as disclosed herein can be further enhanced to add a domain-aware information extraction pipeline to extract information from collected documents. Particular OCR errors can be corrected using domain-specific knowledge rules of a domain-aware business layer. Additionally, particular content extractions can be performed on the input document pages. For example, table extraction, connected words, label extractions, or the like can be performed with the document classification and information extraction system. As described above, trained machine learning models can be used to recognize the structures of common documents (e.g., W2 forms, paystubs, etc.). Address and name validations can also be performed using domain-specific knowledge rules and/or trained machine learning models. Box or shape and line detection can also be performed on the input documents. Domain-specific knowledge rules and/or trained machine learning models can also perform contextual table extractions using, for example, blacklisted words, whitelisted words, etc. The document classification and information extraction system can also be configured to perform validation of content across various entities in a document. Document templates can also be used to identify particular portions of interest in an input document. In general, various tools as described herein used singularly or in combination can be employed to identify and merge pages of documents provided in an input stream. Details of the various example embodiments disclosed herein are provided below and in the accompanying drawings.

Figure 9:
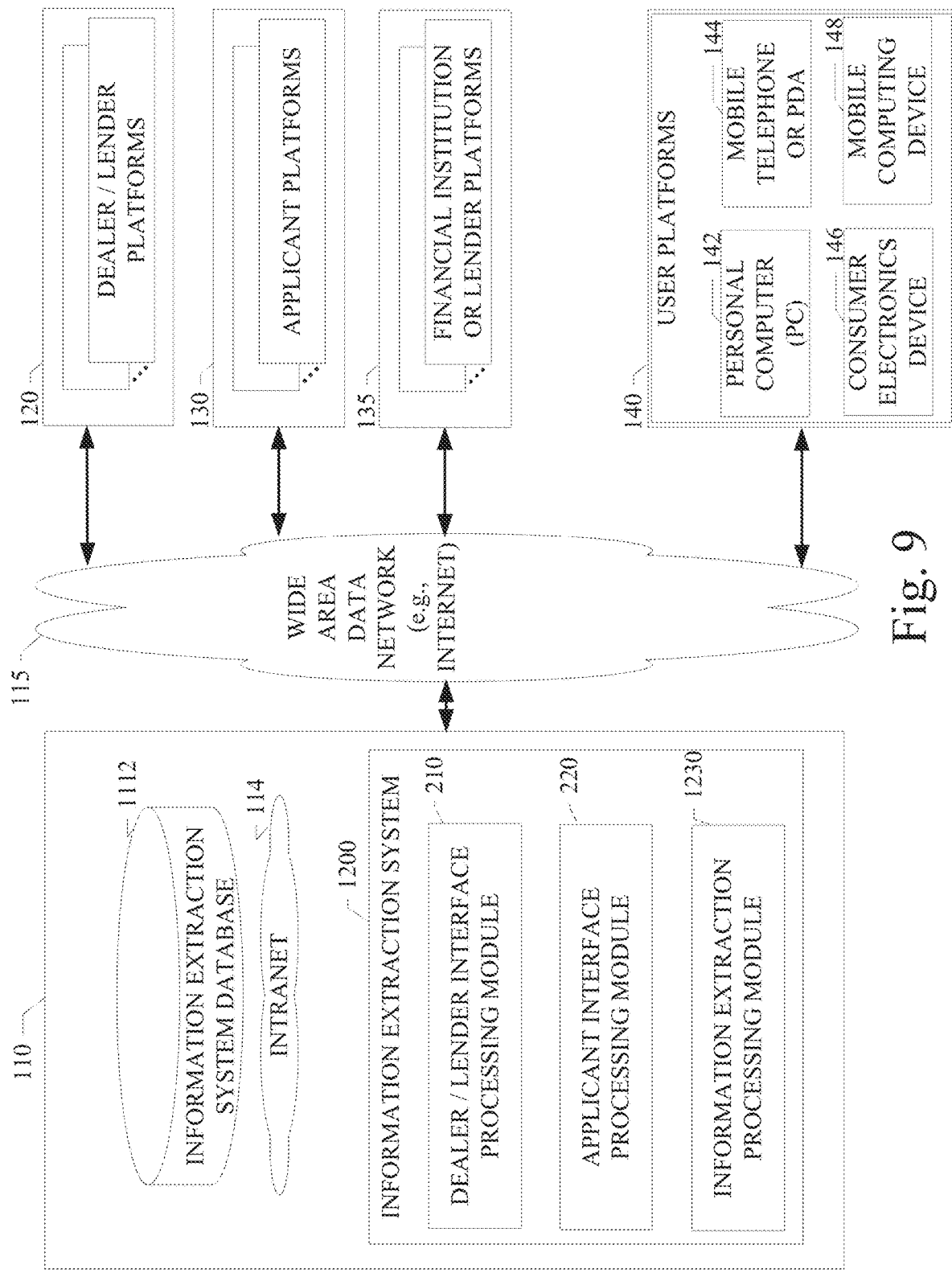
FIG. 9 illustrates an example embodiment of a networked system in which various embodiments may operate.

FIG. 9 illustrates an example embodiment of a system and method for domain aware information extraction and processing. In various example embodiments, an application or service, typically provided by or operating on a host site (e.g., a website) 110, is provided to simplify and facilitate the downloading or hosted use of the information extraction system 1200 of an example embodiment. In a particular embodiment, the information extraction system 1200 can be downloaded from the host site 110 by a user at a user platform 140. Alternatively, the information extraction system 1200 can be hosted by the host site 110 for a networked user at a user platform 140. The details of the information extraction system 1200 for an example embodiment are provided below.

Referring again to FIG. 9, the information extraction system 1200 can be in network communication with a plurality of dealer/lender platforms 120 and/or applicant platforms 130. The dealer/lender platforms 120 can include user platform computing and/or communication devices, websites, or other network resources at which product sellers or brokers operate or at which information regarding sellers and products (e.g., vehicles) offered for sale is available. In some cases, seller/brokers operating at the dealer/lender platforms 120 can have their own finance departments from which loan applications or credit applications for customers or consumers can be processed. The information extraction system 1200 can be configured to provide data communications for the user platforms serving as networked platforms for product sellers/brokers and to obtain seller information, product information, and consumer information in a digital or computer-readable form via the network 115. The applicant platforms 130 can include user platform computing and/or communication devices configured to serve as networked platforms for product consumers (e.g., potential product buyers) and to obtain consumer information including, consumer financing information, consumer characteristics, consumer activities, consumer product interests, or other consumer information. The information extraction system 1200 can be configured to obtain or extract this consumer information in a digital or computer-readable form received via the network 115. The information extraction system 1200 can also be in network data communication with a plurality of other information sites, such as consumer data or credit reporting platforms, and/or product valuation or rating sites. These types of on-line consumer data or credit reporting sites and product valuation or rating sites are well known to those of ordinary skill in the art.

The information extraction system 1200 can also be in network data communication with a plurality of on-line financial institution or lender sites 135. The information extraction system 1200 be configured to provide data communications for the user platforms or websites serving as networked platforms for on-line financial institutions or lenders and to obtain potential consumer-related financing, loan, or credit information in a digital or computer-readable form from one or more of the on-line financial institution or lender platforms 135 via the network 115. The information extraction system 1200 be also be configured to provide data communications for the on-line financial institution or lender platforms 135 to enable the networked usage, transfer, or downloading of a dealer/lender interface processing module 210. The dealer/lender interface processing module 210 may initially reside with a financial institution or lender 135 or may be downloaded to or from the host site 110. In other words, the dealer/lender interface processing module 210 may be used, transferred, or downloaded to the host site 110 and the information extraction system 1200 therein via the network 115. As such, the dealer/lender interface processing module 210 may be hosted by the host site 110 or locally resident and locally used by a dealer or lender at dealer/lender platform 120 and/or a consumer at an applicant platform 130.

One or more of the dealer/lender platforms 120, the applicant platforms 130, and the on-line financial institution or lender sites 135 can be provided by one or more third party providers operating at various locations in a network ecosystem. It will be apparent to those of ordinary skill in the art that dealer/lender platforms 120 or applicant platforms 130 can include or be any of a variety of networked third party information providers or on-line vendors or merchants as described in more detail herein. In a particular embodiment, a resource list maintained at the host site 110 can be used as a summary or list of all dealer/lender platforms 120, applicant platforms 130, and on-line financial institution or lender sites 135, which users or the host site 110 may visit/access and from which users or the host site 110 can obtain seller data, product data, consumer data, or consumer financial or credit information. The host site 110, dealer/lender platforms 120, applicant platforms 130, on-line financial institution or lender sites 135, and user platforms 140 may communicate and transfer data and information in the data network ecosystem shown in FIG. 9 via a wide area data network (e.g., the Internet) 115. Various components of the host site 110 can also communicate internally via a conventional intranet or local area network (LAN) 114.

In a particular embodiment, a user platform 140 with one or more client devices enables a user to access data provided by the information extraction system 1200 via the host 110 and network 115. Client devices of user platform 140 may include virtually any computing device that is configured to send and receive information over a network, such as network 115. The client devices of user platform 140 may also include at least one client application that is configured to receive product data, consumer data, financing data, and/or control data from another computing device via a wired or wireless network transmission. The client application may include a capability to provide and receive textual data, graphical data, video data, audio data, and the like. Moreover, client devices of user platform 140 may be further configured to communicate and/or receive a message, such as through a Short Message Service (SMS), direct messaging (e.g., Twitter™), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

Referring again to FIG. 9, the information extraction system 1200 for an example embodiment is shown to include an information extraction system database 1112. The database 1112 can be used to retain a variety of information data sets including, but not limited to, seller information, product or product listing information, consumer information, buyer financing or credit information, loan information, targeted buyer group or custom audience information, advertisement (ad) data, buyer/seller/product analytics, and the like. It will be apparent to those of ordinary skill in the art that the information extraction system database 1112 can be locally resident at the host site 110 or remotely located at other server locations or stored in network cloud storage.

Referring again to FIG. 9, host site 110 of an example embodiment is shown to include the information extraction system 1200. In an example embodiment, information extraction system 1200 can include a dealer/lender interface processing module 210, an applicant interface processing module 220, and an information extraction processing module 1230. Each of these modules can be implemented as software components executing within an executable environment of information extraction system 1200 operating on host site 110 or user platform 140. Each of these modules of an example embodiment is described in more detail below in connection with the figures provided herein.

Referring still to FIG. 9, the information extraction system 1200 can include a dealer/lender interface processing module 210 and an applicant interface processing module 220. The dealer/lender interface processing module 210 can facilitate communication and the transfer of data and documents between a user at a dealer/lender platform 120 and the host site 110. The applicant interface processing module 220 can facilitate communication and the transfer of data and documents between a user at an applicant platform 130 and the host site 110. The dealer/lender interface processing module 210 and the applicant interface processing module 220 can be configured to perform the processing as described in more detail herein. The dealer/lender interface processing module 210 can be resident at the host site 110, resident on a dealer/lender platform 120, or partially resident on a plurality of user platforms 140. Similarly, the applicant interface processing module 220 can be resident at the host site 110, resident on an applicant platform 130, or partially resident on a plurality of user platforms 140. The information extraction system 1200 be configured to provide data communications for the dealer/lender platforms 120 and the applicant platforms 130 to enable the networked usage, transfer, or downloading of information, requests, images, documents, and related data to facilitate the gathering and validation of stipulations related to a seller/consumer transaction. The information extraction processing module 1230 can be configured to implement the information extraction pipeline as described in more detail below. The components and processes for the gathering, extraction, and validation of stipulations related to a seller/consumer transaction as embodied in the dealer/lender interface processing module 210, the applicant interface processing module 220, and the information extraction processing module 1230 are described in more detail below.

Figure 10:
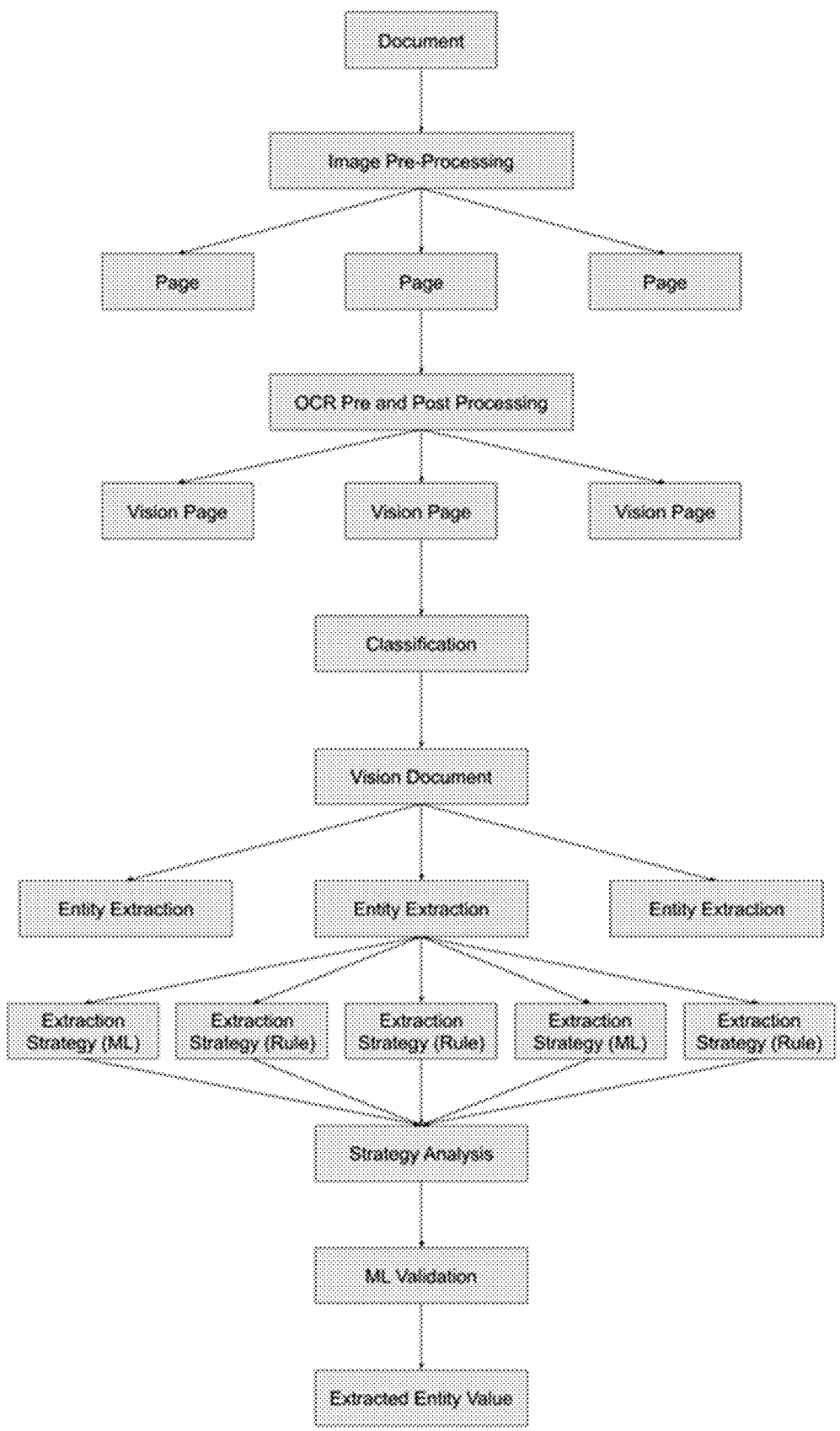
FIG. 10 illustrates an example embodiment of an information extraction pipeline.

As described above, a consumer loan application may contain multiple files and multiple documents in each file. The document classification system described above can process and split these files into single documents that are ready for extractions. Our classification system can output a specific document, which is the image, and it's corresponding OCR text. Given a type of document as classified by the document classification system, the document classification and information extraction system can obtain a corresponding schema as defined for all document types that might be part of a consumer loan application. For example, the schema of paystub may include a field name and the type of value corresponding to the field name. An example is set forth below:

1. Name: String
2. Address: Address
3. Employer Name: Organization String
4. Employer Address: Address
5. Employer Phone: Legit phone number (usually 10 digits)
6. Hours worked: Number
7. Hourly rate: Number
8. Base pay: Currency
9. YTD Gross Pay: Currency
10. Medicare taxes: Currency
11. Social security taxes: Currency
12. Federal taxes: Currency
13. State taxes: Currency
14. Net pay: Currency
15. Loans: Currency
16. Garnishments: Currency
17. Deductions: Currency
18. Overtime: Currency
19. Pay begin date: Date
20. Pay end date: Date
21. Pay/Check date: Date
22. Commissions: Currency
23. Tips: Currency The information extraction system 1200, and the information extraction processing module 1230 therein, can implement an information extraction pipeline, which performs a series of information extraction operations to extract information from a given document. This information extraction pipeline for an example embodiment is shown in FIG. 10 and described in detail below.

Document Pre-Processing

As part of the information extraction pipeline of an example embodiment, there are various image processing operations in place before the information extraction processing module 1230 runs OCR on a given consumer document.

a. Major Rotations

Figure 11:
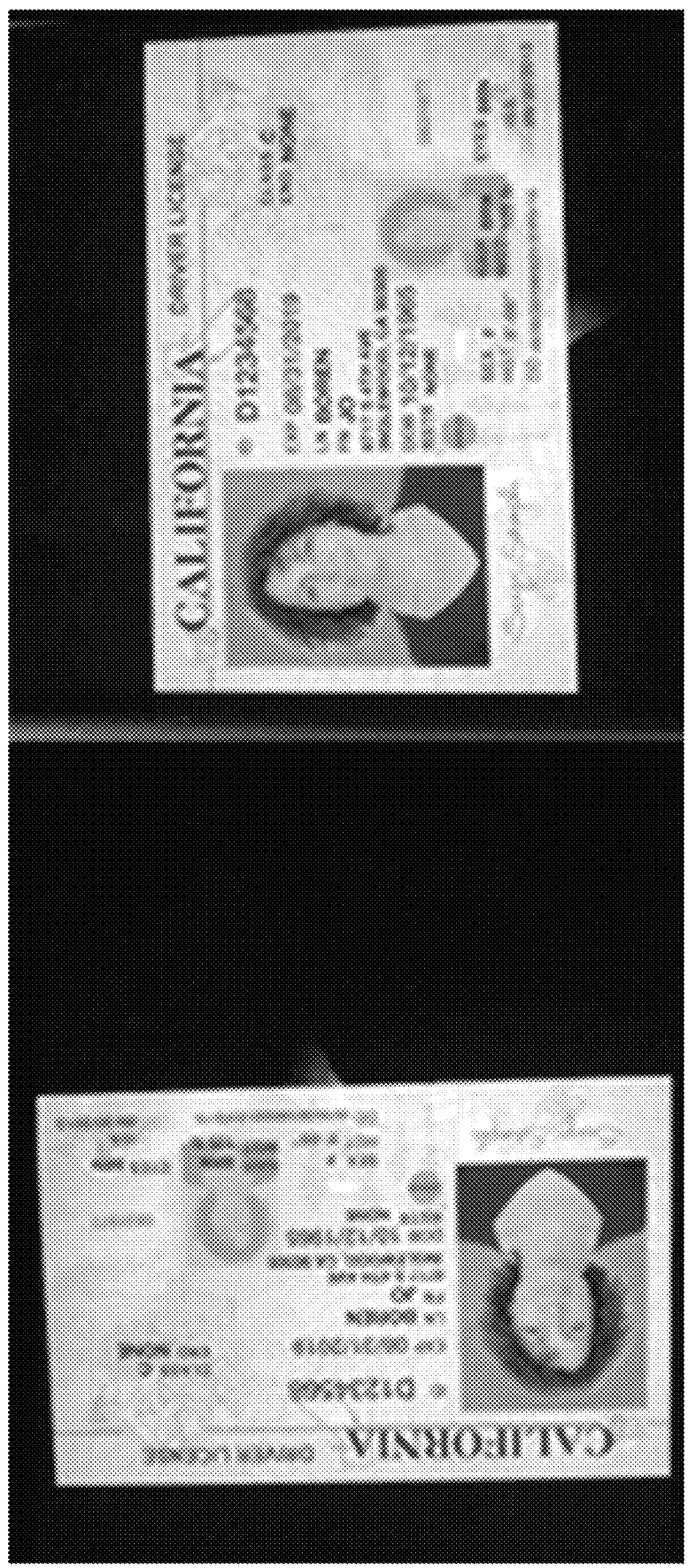
FIG. 11 illustrates an example of a document needing a major rotation as processed by the information extraction pipeline.

Documents available in a consumer application are not necessarily in a correct vertical alignment. We have cases where the document is rotated by 180 degrees. The information extraction processing module 1230 uses the lines present on the document and the text present on the document to identify if the document has major rotations (over 5 degrees). If so, the information extraction processing module 1230 can rotate the document in the reverse direction for the information extraction pipeline to work more efficiently. For an example, see FIG. 11.

b. Minor Rotations

Figure 12:
FIG. 12 illustrates an example of a document needing a minor rotation as processed by the information extraction pipeline.
Figure 12:
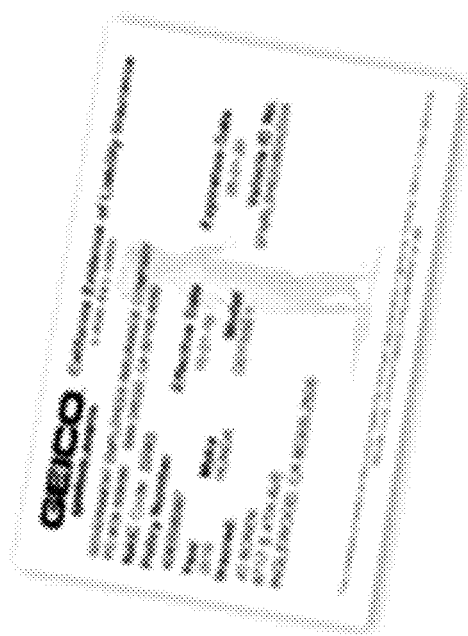

There are some documents where the rotation is at a very small angle. This small angle or minor rotation can cause errors in spatial operations in some cases. The information extraction processing module 1230 can use long sentences and various words to figure out minor rotation needs. Using the text on the document, the information extraction processing module 1230 can figure out the minor rotation angle and rotate the document accordingly. For an example, see FIG. 12.

c. De-Noising

Documents come in from a variety of sources like fax, phone camera, scanner, etc. All these devices add a certain level of noise to the document making it harder for operations to read the document and extract entities. The information extraction processing module 1230 can perform various operations to de-noise such documents, mostly focused on the type of noise present in consumer application deal jackets.

Document Specific OCR Processing Engine

After document pre-processing, optical character recognition, and classification, the information extraction processing module 1230 runs a document type-specific processing engine. The document type-specific processing engine provides the domain aware context for the information extraction processing module 1230. This engine has various modules that utilize the type of document to overcome the limitations of state-of-the-art optical character recognition models. In the disclosure that follows, we have provided examples of various issues that are tricky to solve in a generic (i.e., non-domain aware context) fashion, and how the information extraction pipeline of an example embodiment overcomes the limitations of the conventional technologies by use of a domain aware context.

a. Document Specific Spell Corrector

Spell correctors of the conventional technologies sometimes don't work well because of various industry-level jargon in these consumer documents. For example, "Reg" refers to regular on a paystub, "wgt" refers to weight on a driver's license. After a lot of experimentation, we realized that document group-specific spell correctors lead to much better results. As a result, the information extraction pipeline of an example embodiment provides a spelling corrector, which is document specific and which also accounts for various OCR mistakes, for example, "B" being read as "8".

b. Contextual Phrase Constructor

There are words like a year to date, full name, etc., which are made up from multiple individual words and separated by space or some other delimiter. The information extraction pipeline of an example embodiment provides extensive regular expressions based on the analysis of tens of thousands of documents, which helps the information extraction pipeline of an example embodiment to combine such phrases very accurately. The information extraction pipeline of an example embodiment can also account for various forms of words as part of this, and if the spell corrector misses on some words, this operational step helps to correct these anomalies too.

c. Spatial Phrase Constructor

There are various structured documents available in a consumer loan application. These documents can have various groups of words, for example, "Available vacation days." A conventional phrase constructor has some limitations as it covers all the commonly occurring phrases, but misses out on uncommon phrases. A spatial phrase constructor of the information extraction pipeline of an example embodiment takes the advantage of the structure of the document and groups the words based on the spatial location. This helps the information extraction pipeline to identify the kind of information that is present in a document and enables extractions of the relevant value associated with a relevant label.

d. Entity Constructor

The information extraction pipeline of an example embodiment provides regular expressions that help to parse various dates, dollar amounts, social security numbers, and various other standard entities. Over years, we have perfected our strategy to identify such entities from the document and to configure this strategy into the information extraction pipeline of an example embodiment.

e. Ambiguous Character Solver

Many consumer loan documents aren't of great quality, and there is often confusion between characters looking visually similar. For example, $, S, and 5 looks similar in poor quality scans. The information extraction pipeline of an example embodiment can use context information like neighboring words or document types to solve this ambiguous character problem. There are other issues like two amounts being next to each other and the space in the middle is not detected by OCR software. The information extraction pipeline of an example embodiment can use context information like font width in such cases to be able to add space if required.

c. Tables

The information extraction pipeline of an example embodiment is also configured to identify and extract tables from within digital documents. For example, FIG. 14 illustrates an example of a document having a plurality of tables as processed by the information extraction pipeline. The table information found and extracted by the information extraction pipeline from the document shown in the example of FIG. 14 is set forth below:

TABLE 1

```
+-----------+------------------------------------------------------+-----------------+---------+
| 0         | 1                                                    | 2         | 3     |
+-----------+------------------------------------------------------+-----------------+---------+
| Date      | Description                                          |         | Amount |
| 03/02/18  | CHASE CREDIT CRD DES: AUTOPAY ID: 4760039224 PPD     | CO      | -98.92 |
| 03/02/18  | VENMO DES: PAYMENT ID: XXXXXXXXX ID: 3264681992 WEB  | CO      | -50.00 |
| 03/03/18  | SAND HARBOUR SOU DES: HOA DUES ID: 000149 PPD        | CO ID: 94-2329583 | -530.00 |
| 03/13/18  | PAYPAL DES: INST XFER ID: 5QBJ2AAZVMKQW ID: PAYPALSI77 WEB | CO | -96.25 |
| 03/14/18  | SMC TAX ECHECK DES: TAX PYMT ID: SMC TAX ECHECK ID: 1946000532 WEB | CO | -3,138.29 |
| 03/14/18  | BMWFINANCIAL SVS DES: BMWFS PYMT ID: XXXXXXXXX ID: 1222568977 PPD | CO | -547.53 |
| 03/14/18  | CHASE CREDIT CRD DES: EPAY ID: 3325409733 ID: 5760039224 WEB | CO | -296.05 |
| 03/21/18  | PGANDE DES: WEB ONLINE ID: 83608536110117 ID: 5940742640 WEB | CO | -71.91 |
| 03/27/18  | MACYS DES: PAYMENT ID: 212471493300123 ID: CITIGPUFDR TEL | CO | -72.59 |
| 03/27/18  | KEEP THE CHANGE TRANSFER TO ACCT 4217 FOR 03/31/18   |         | -0.50  |
| Total other | subtractions                                       |         | -$4,902.04 |
+-----------+------------------------------------------------------+-----------------+---------+
12 rows in set
```

Feature Extractions

The information extraction pipeline of an example embodiment is configured to extract more rich features from the document in addition to the text from the document. These features are extracted from the document and stored, and extraction strategies can make use of these features. Some examples of these features extracted and used by the information extraction pipeline of an example embodiment are described below:

a. Sections

Figure 13:
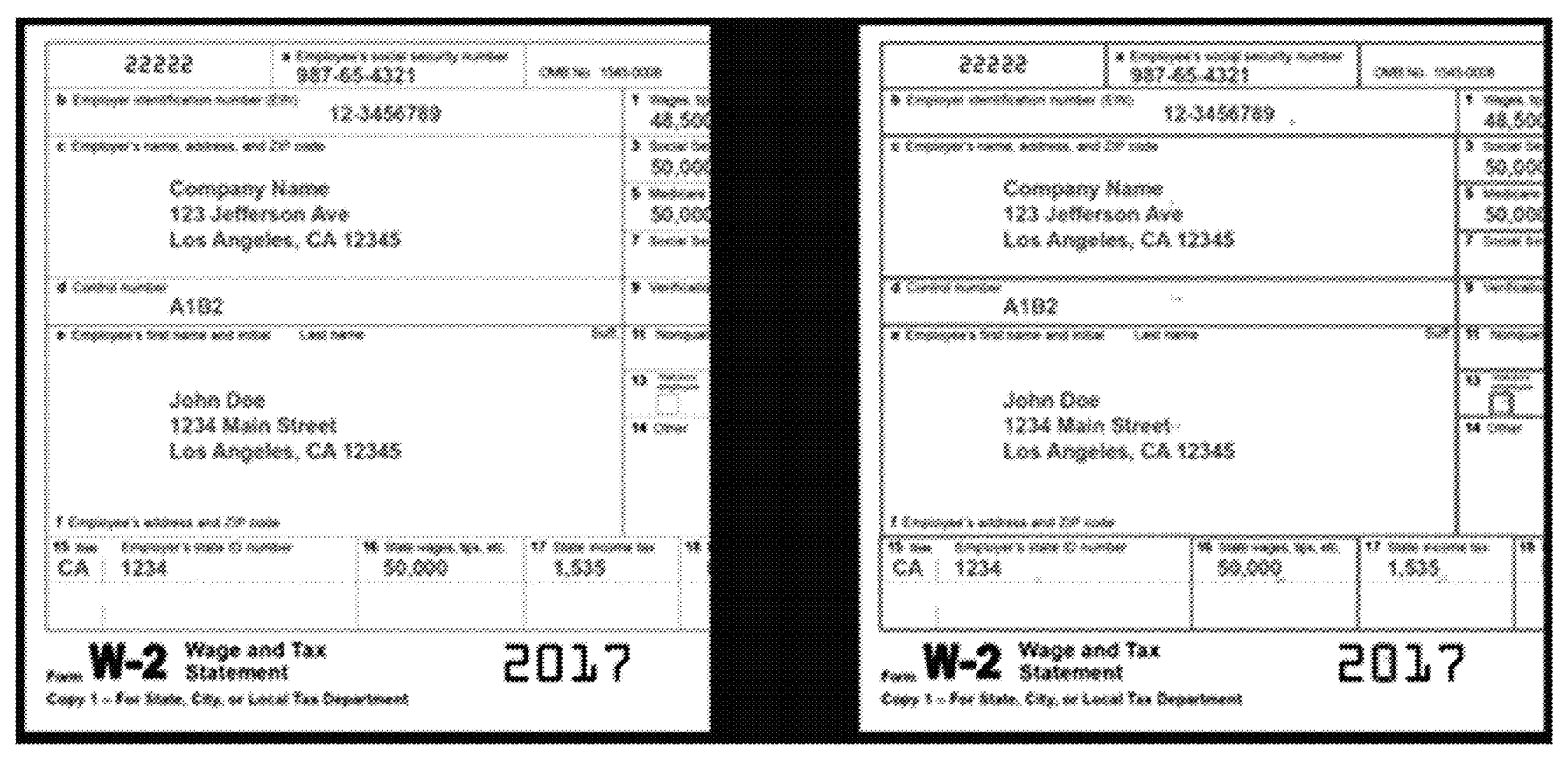

Many consumer documents are structured with various sections, like "Dealer Information", "Applicant Information", "Earnings Information", etc. The information extraction pipeline of an example embodiment is configured with models that can isolate these sections in a given document. This is very useful in cases where we have to identify the context of the text. For example, if there are multiple names on the document and the label just says "Name", the information extraction pipeline of an example embodiment is configured to use section information to identify whose name it is. For example, see FIG. 13 as an example of a W2 document having a plurality of sections as processed by the information extraction pipeline.

b. Boxes/Lines/Checkboxes

Additionally, the information extraction pipeline of an example embodiment is configured to identify lines, polygons, and checkboxes within digital documents. The information extraction pipeline uses processing operations and strategies to identify when a shape is actually a shape that would be of interest for data extraction. The information extraction pipeline also filters out multiple occurrences of shapes that are in very close proximity to each other to recognize that within the context of data extraction, the shapes represent one element. The information extraction pipeline also uses a processing operation to determine if a checkbox is checked or unchecked within a digital document.

TABLE 2

```
+--------+----------------------------------+----------+
| 0      | 1                                | 2        |
+--------+----------------------------------+----------+
| Date   | Transaction description          | Amount   |
| 03/14/18 | Preferred Rewards-ODP Trnsfr Fee Waiver of $12 | -0.00 |
| Total  | service fees                     | -$0.00   |
+--------+----------------------------------+----------+
3 rows in set
``` d. Connection Matrix

Figure 15:
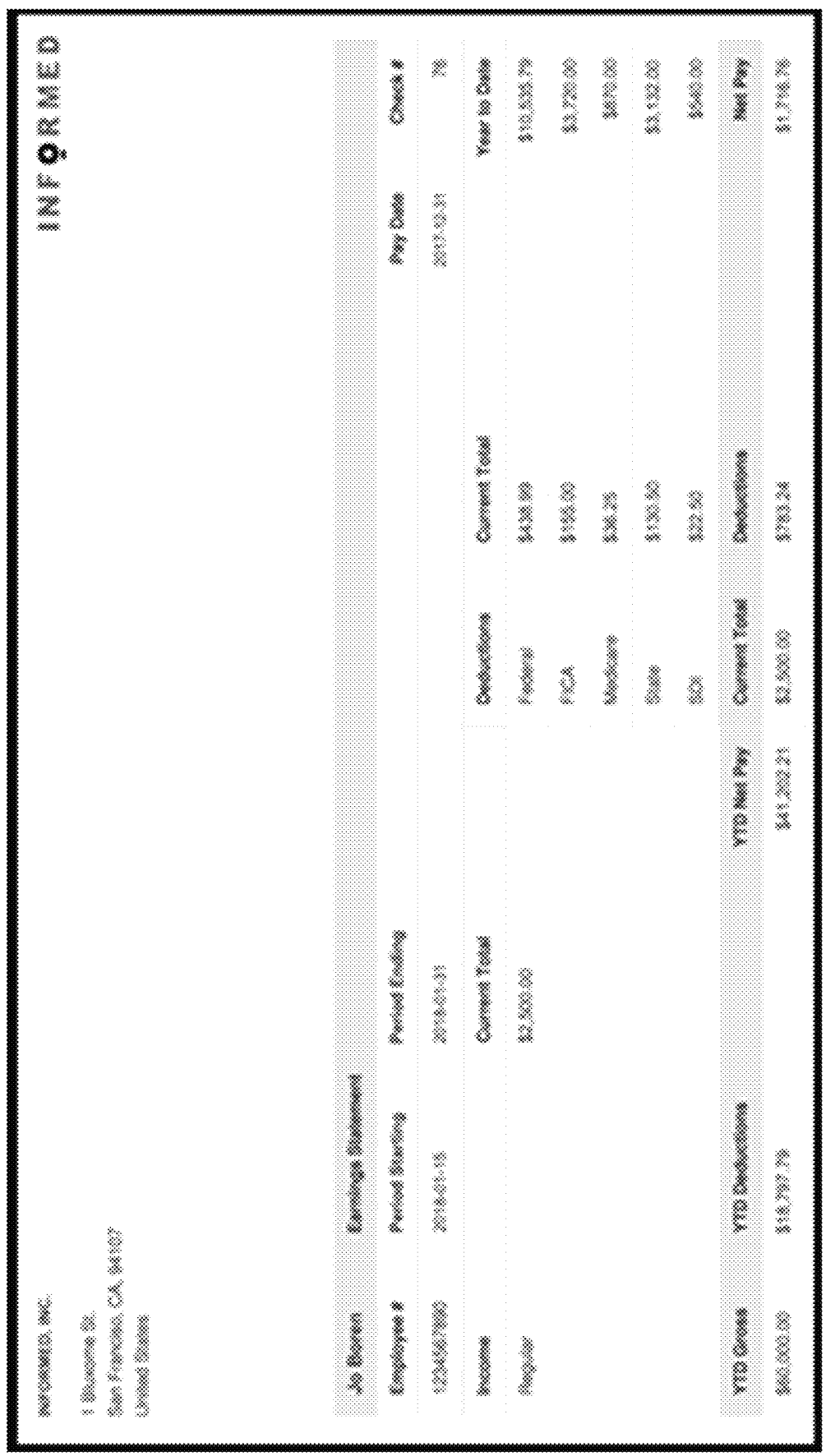
FIG. 15 illustrates an example of a paystub document for which a connection matrix can be generated by the information extraction pipeline.

A connection matrix is similar to a free-flowing table. The information extraction pipeline of an example embodiment is configured to make a graph of all the words in an input document. For each word in the document, the information extraction pipeline defines a plurality of functions related to the word, including: word above, word below, word on right, etc. This processing is similar to the table processing described above; however, the connection matrix processing in the example embodiment is more free-flowing and is not restrained by the strict format of a table. The generation and use of the connection matrix is very important to various strategies like table extraction and label extractors. For example, FIG. 15 illustrates an example of a paystub document for which a connection matrix can be generated by the information extraction pipeline. In the sample paystub shown in FIG. 15, a sample portion of the generated connection matrix is shown below:

$$word.dollar\_amount = > 3132.0$$

$$document.connected\_words[word].top\_label.text = > \text{"year to date"}$$

$$document.connected\_words[word].left\_label.text = > \text{"State"}$$

e. Signatures

The information extraction pipeline of an example embodiment is configured to use a YOLO (You Only Look Once) object detection model to detect signatures on a given page. YOLO architecture is similar to an FCNN (fully convolutional neural network), which passes an image (e.g., a document page image) once through the FCNN to produce an output. The model of an example embodiment supports multiple signatures and gives the bounding boxes of the located signature. The information extraction pipeline of an example embodiment is further configured to use the words surrounding the bounding box of the signature to identify if the signature is by the applicant, co-applicant, car dealer, or some other authority. The information extraction pipeline of an example embodiment is also configured to use the surrounding text information along with a confidence indication corresponding to the signature from the YOLO model to decide if a real signature is present. This processing operation ensures that we don't consider random scribbles/handwritten notes as a signature.

f. Combining Multiple OCR Strategies

The information extraction pipeline of an example embodiment is configured to use multiple third-party OCR vendors, to accurately detect and extract the text, forms, lines, boxes, and tables from a document. The information extraction pipeline of an example embodiment is configured to use multiple OCR modules for detection and extraction, the results of which can be superimposed and logically combined into one final version of the digital document.

Extraction Strategies

The information extraction pipeline of an example embodiment is configured to use one or more of a plurality of different extraction strategies based on the type of the document and the information fields to be extracted. Given the document type, the information extraction pipeline of an example embodiment is configured to use a subset and/or combinations of these different extraction strategies as described below.

a. Table Extraction

The information extraction pipeline of an example embodiment is configured to detect tables in structured documents as described above. The information extraction pipeline works for all table sizes. The information extraction pipeline is also configured to use geometry to determine the locations of various rows, columns, and the corresponding values. The information extraction pipeline also accounts for various rotation angles, skews, and also supports missing values.

b. Contextual Table Extractors

Wide tables on a document cause various issues because it's hard to match the values across columns without any context. Humans have a hard time reading a table if the lines are not clear. Humans use context type of value to accurately read the table. Similarly, the information extraction pipeline of an example embodiment is configured to use a context to determine how to extract information from tables.

c. Label Extractors

For structured documents, there is typically a key-value format. For example, Name: John Doe. The label extractor operation of the information extraction pipeline looks for such cases geometrically and contextually.

d. Machine Learning-Based Candidate Prediction

The information extraction pipeline of an example embodiment is configured to generate candidates from a document or various fields. Then, the information extraction pipeline can be configured to use a machine learning model to pick the most suitable candidate for the given field. The information extraction pipeline of an example embodiment is configured to use various features for every candidate, ranging from words around a candidate in the document, type of candidate (date, dollar amount, text), and distances to various other relevant text in the document.

e. Machine Learnings Key-Value Pairs

Figure 16:
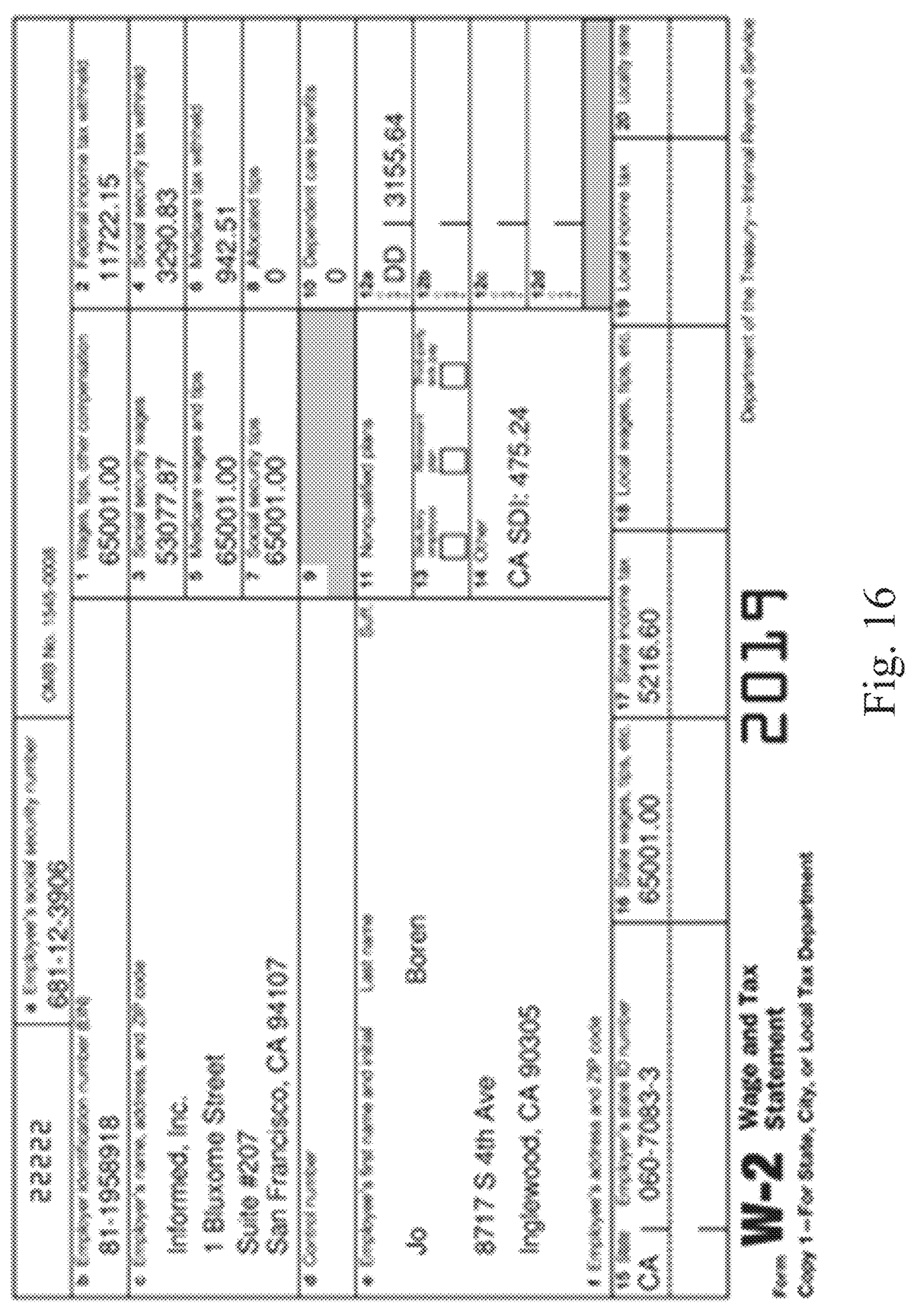

For some documents, the information extraction pipeline can be configured with machine learning models that, given the text of the document, can predict key-value pairs present in the document. Various forms of key-value pairs have the format of key-value, where the applicant fills in the information or value corresponding to a given key. The machine learning models of the information extraction pipeline can be configured to pick the correct values for various keys present in a document. For example, see FIG. 16 where key-value pairs are extracted from a sample W2 document to produce the sample key-value pairs set forth below:

```
{
"6 Medicare tax withheld" => "942.51",
"4 Social security tax withheld" => "3290.83",
"3 Social security wages" => "53077.87",
"5 Medicare wages and tips" => "65001.00",
"1 Wages, tips, other compensation" => "65001.00",
"a Employee's social security number" => "681-12-3906",
"Retirement plan" => "",
"Employer's state ID number" => "060-7083-3",
"7 Social security tips" => "65001.00",
"b Employer identification number (EIN)" => "81-1958918",
"16 State wages, tips, etc." => "65001.00",
"2 Federal income tax withheld" => "11722.15",
"8 Allocated tips" => "0",
"17 State income tax" => "5216.60",
"14 Other" => "CA SDI: 475.24",
"Third-party sick pay sick pay" => "",
"12a" => "DD 3155.64",
"c Employer's name, address, and ZIP code" => "Informed, Inc. 1 Bluxome Street Suite
   #207 San Francisco, CA 94107",
"State" => "CA",
"f Employee's address and ZIP code" => "8717 S 4th Ave Inglewood, CA 90305",
"Last name" => "Boren",
"10 Dependent care benefits" => "0"
}
``` f. Named Entity Recognition (NER) for Names and Address

The information extraction pipeline of an example embodiment is configured to use industry-standard models for NER extraction. For example, some example embodiments of the information extraction pipeline can be configured with trained machine learning models in conjunction with conventional entity extraction models.

g. Cross Document Prediction (e.g., Consecutive Bank Statements, Paystubs, Etc.)

A consumer loan application includes various documents like bank statements, pay stubs, and many others. The information extraction pipeline of an example embodiment is configured to use the context from one document to help to extract entities from other documents. For example, the name of the person (e.g., the applicant) will be the same in various documents of the same loan application. The information extraction pipeline of an example embodiment is configured to use this context to help to determine the applicant name and other information related to the loan application.

h. Applicant Information Context

A consumer loan application typically includes a variety of applicant information. Alternatively, there may be a document that contains all the applicant information. The information extraction pipeline of an example embodiment is configured to use this information as context to aid in the information extraction process. For example, the applicant information can include the applicant reported residence and the applicant reported employment information. The information extraction pipeline of an example embodiment is configured to use this context information to help solve ambiguity during extraction and also to shortlist the most likely candidates for extraction.

i. World Wide Web Search

The information extraction pipeline of an example embodiment is configured to take advantage of search engines to improve information extractions. There are cases where it's hard to know about the entity, for example, an organization, payroll provider, dealership, etc. When the information extraction pipeline encounters situations where there are ambiguities about a particular entity, the information extraction processing module 1230 can be configured to perform Web searches through search engine APIs to obtain more information about the entity in question. As a result, the information extraction pipeline is able to extract correct information.

j. Location-Related APIs

Applicants sometimes have different addresses listed on different documents. It might be the same physical address; but, there are some minor differences in some cases. The information extraction pipeline of an example embodiment is configured to use location APIs to solve such cases and make sure the extracted address is in fact legitimate. The information extraction pipeline of an example embodiment is also configured to use this process to validate various other elements of documents, for example, employer address.

Validation Strategies

The information extraction pipeline of an example embodiment is configured to use various validation methods to improve accuracy. The information extraction pipeline of an example embodiment is configured to use among the following methods:

a. Validation Across Various Entities in a Document

The information extraction pipeline of an example embodiment is configured to use various validation strategies that use document specific knowledge to make sure that various extracted fields from a document make sense. For example, taxes on a financial statement should be in line with the other information present in the document. Some examples of such relationships are:

1. Hours and Hourly rate on a payslip should yield a salary.
2. Medicare, social security and federal tax should be in alignment with the salary.
3. Deposits in bank statements should line up with total deposits and monthly rotating balance.

b. Validation with the Applicant Provided Information

A loan application has multiple documents provided by an applicant. The information extraction pipeline of an example embodiment is configured to use these documents to make sure the applicant provided information is accurate. For example, if there is a W2 in the application along with a payslip, the information extraction pipeline of an example embodiment is configured to cross-check the taxes withheld and salary across different documents. For example, the information extraction pipeline of an example embodiment is configured to compare SSN, address, full name, and other standard information provided on various different documents.

c. Validation with Industry-Standard Average Information

The information extraction pipeline of an example embodiment is also configured to use industry-specific context for accurate information extraction. For example, the typical range of dates on documents for a consumer loan application submitted on a certain date can be determined by the context. Such information elements are part of the information extraction pipeline where a sanity check can be performed on various information element extractions. This helps the information extraction pipeline to maintain a high level of precision.

d. Validate Entities Using the Power of World Wide Web

Once the information extraction processing module 1230 extracts various information entities, the information extraction processing module 1230 can use search engine APIs to make sure that the extracted information is legitimate. For example, addresses and organizations are easily available on these search engines. Performing a validation check helps us be more confident in our extractions.

Extraction Strategy Analysis

Figure 17:
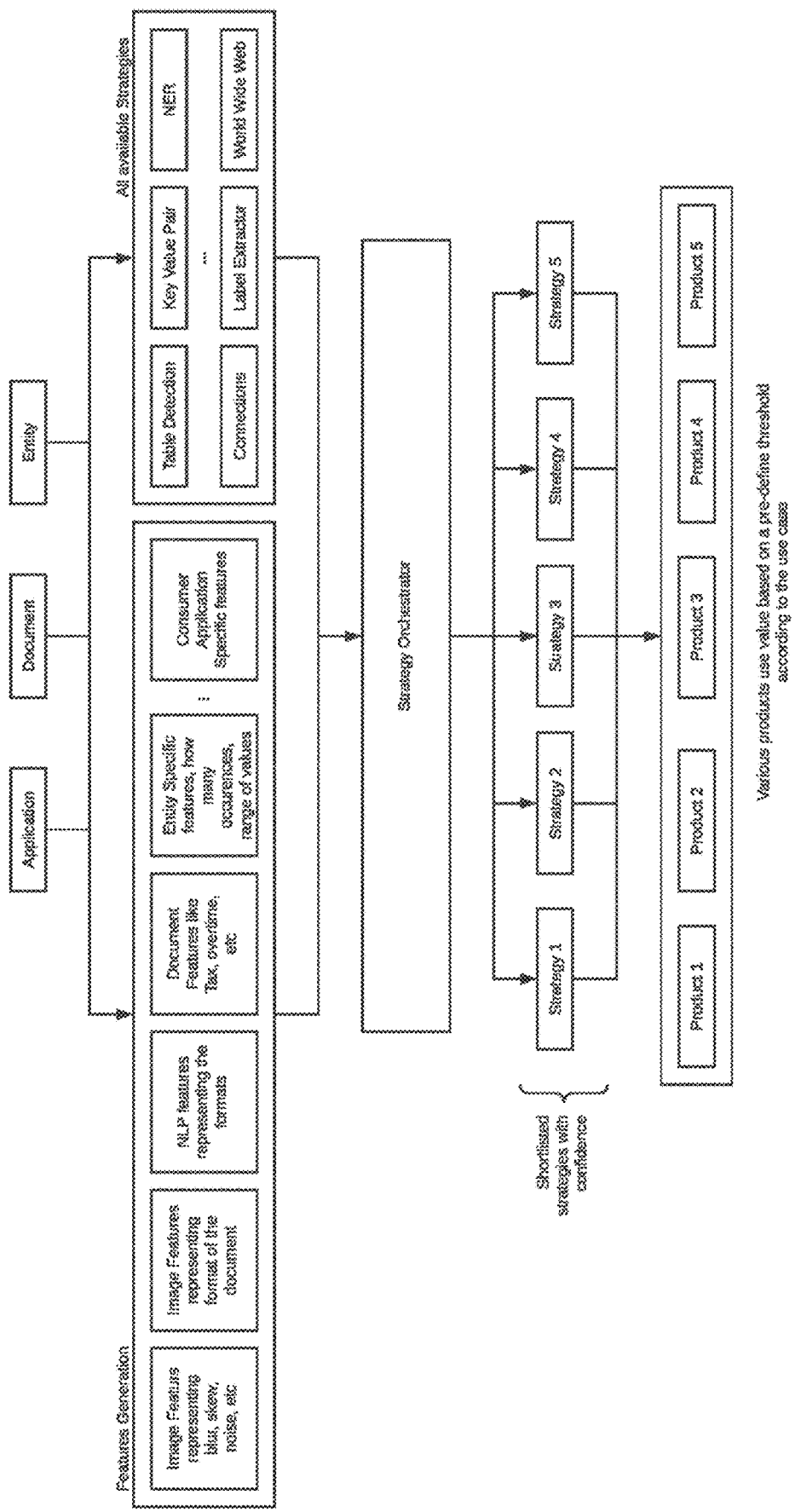
FIG. 17 illustrates a processing flow diagram that shows the strategy analysis performed by an example embodiment.

The information extraction pipeline of an example embodiment is configured to support a wide variety of document types and quality. To maintain high accuracy, the information extraction pipeline of an example embodiment is configured with a strategy orchestrator that takes in document features as input and tries to predict what strategy should be used to extract the information. These document features represent the quality and format of the document. The information extraction pipeline can employ a wide variety of different extraction strategies. Some extraction strategies work better in particular contexts, on certain document formats, and with particular document qualities. This strategy orchestrator helps the information extraction pipeline to use the optimal extraction strategy for a given document. FIG. 17 illustrates a processing flow diagram that shows the strategy analysis performed by an example embodiment.

The information extraction pipeline of an example embodiment is also configured to use a strategy analysis to assign a confidence level with each extraction. This confidence level is based on the strategy quality, document format, and document quality. The strategy analysis model of the information extraction pipeline can be periodically updated based on newly received data. These updates help to get rid of the strategies that aren't useful, and those that are diminishing accuracy. The updates inform the information extraction pipeline about new formats to keep the accuracy of the pipeline high.

There are different products that can use this information extraction pipeline as disclosed. The requirements for every product might vary in terms of the precision and recall required. Strategy analysis gives us a confidence level for extraction, can provide results to meet requirements, and can help to provide more automation. For example, one product might not require a very high precision, while other products might require high precision. Strategy analysis will help us pick only the very confident results for high precision requirement products at the cost of the lower recall.

This also makes the extraction pipeline scalable. As we keep adding new strategies or modifying old ones, the strategy analysis processes and strategy orchestrator are able to cherry-pick the extraction strategies that will work well for a specific document and a specific information field. As a result, the information extraction pipeline automates the work required to extract new entities from a document. The information extraction pipeline can utilize some or all of the components disclosed herein to produce the best information extraction for any document or any information field.

Figure 18:
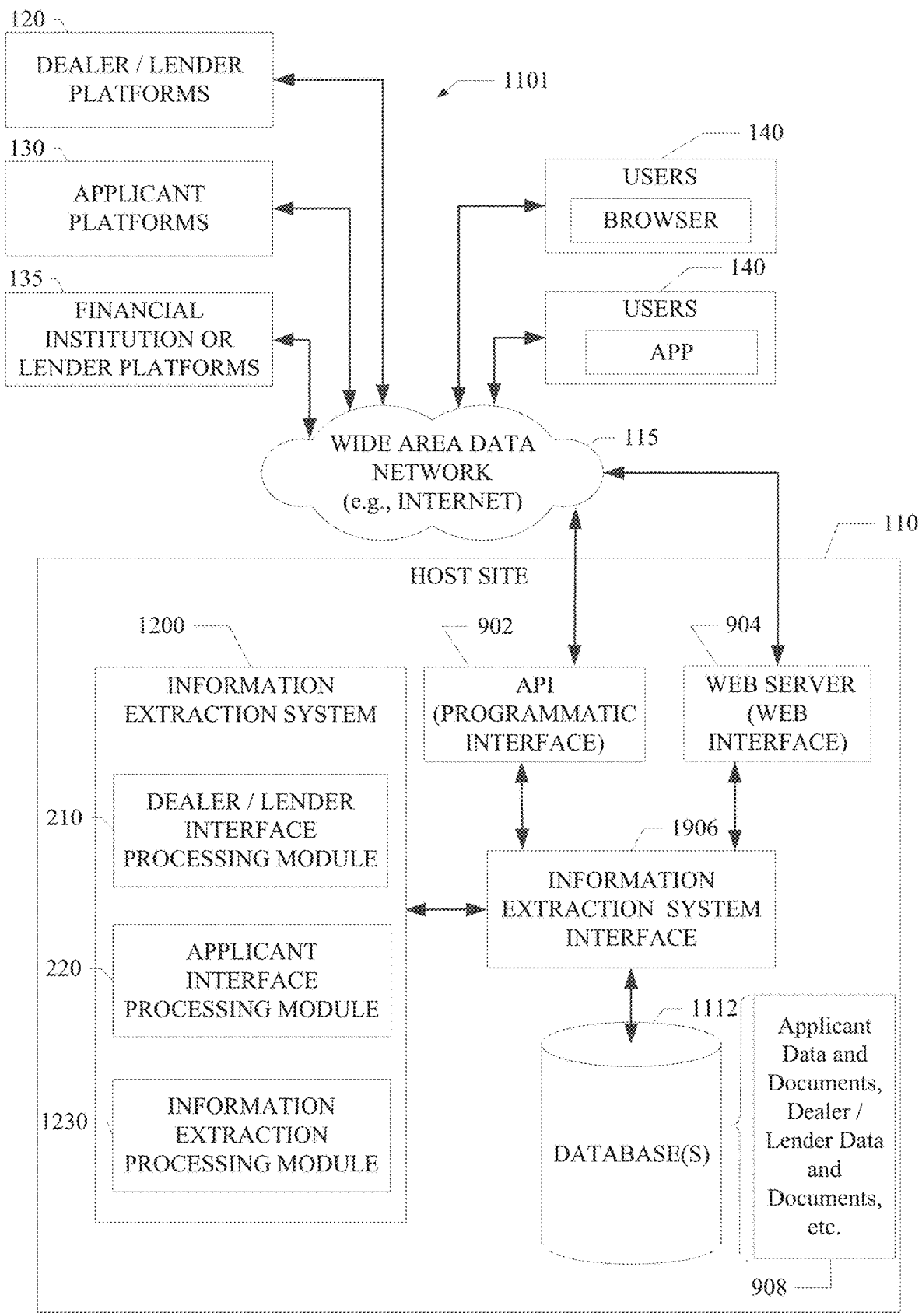
FIG. 18 illustrates another example embodiment of a networked system in which various embodiments may operate.

Referring now to FIG. 18, another example embodiment 1101 of a networked system in which various embodiments may operate is illustrated. In the embodiment illustrated, the host site 110 is shown to include the information extraction system 1200. The information extraction system 1200 is shown to include the dealer/lender interface processing module 210, the applicant interface processing module 220, and the information extraction processing module 1230 as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the information extraction system 1200 either directly or via an interface 1906. The information extraction system 1200 may be configured to access a data storage device 1112 either directly or via the interface 1906.

Figure 19:
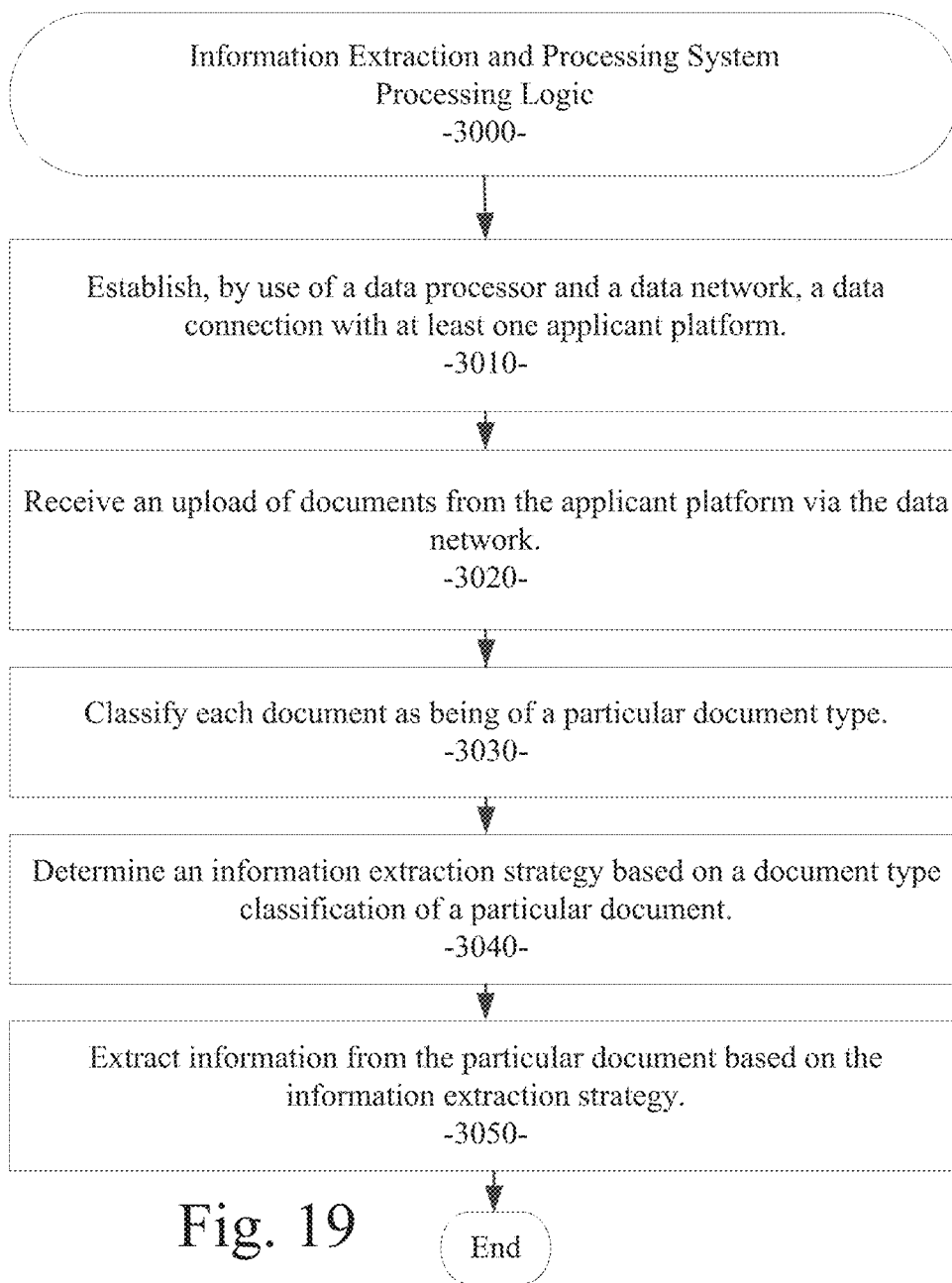
FIG. 19 illustrates a processing flow diagram that illustrates an example embodiment of a method as described herein.

Referring now to FIG. 19, a processing flow diagram illustrates an example embodiment of a method implemented by the information extraction system 1200 as described herein. The method 3000 of an example embodiment includes: establishing, by use of a data processor and a data network, a data connection with at least one applicant platform (processing block 3010); receiving an upload of documents from the applicant platform via the data network (processing block 3020); classifying each document as being of a particular document type (processing block 3030); determining an information extraction strategy based on a document type classification of a particular document (processing block 3040); and extracting information from the particular document based on the information extraction strategy (processing block 3050).

Figure 20:
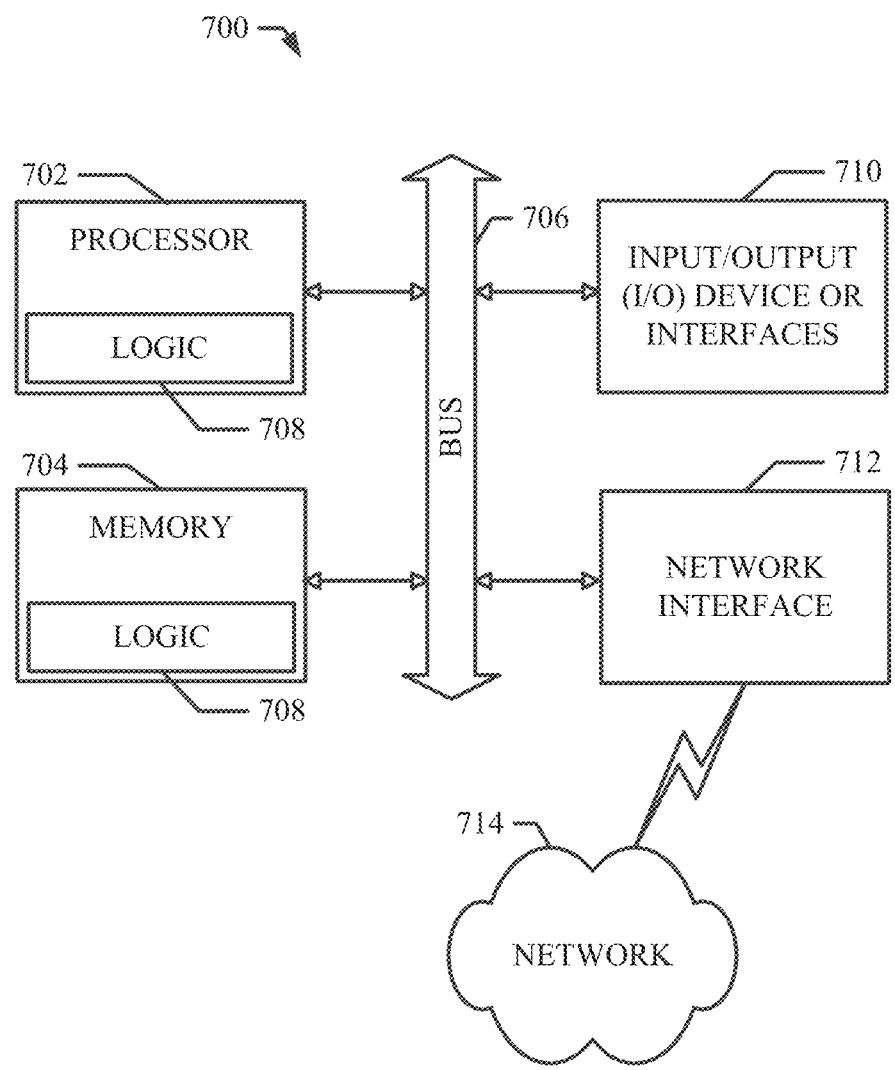
FIG. 20 shows a diagrammatic representation of a machine in the example form of a computer system within which a set of instructions when executed may cause the machine to perform any one or more of the methodologies discussed herein.

FIG. 20 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a mobile device, a web appliance, a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

Various example embodiments of the newly disclosed techniques are described in more detail herein. In various embodiments as described herein, example embodiments include at least the following examples.

A computer-implemented method comprising: establishing, by use of a data processor and a data network, a data connection with at least one applicant platform; receiving an upload of required stipulation documents from the applicant platform via the data network, the uploaded stipulation documents including a plurality of pages; classifying each page of the stipulation documents as being of a particular document type; and merging pages of the stipulation documents based on the document type classification.

The method as disclosed above including determining the presence of a single document type on a single page.

The method as disclosed above including determining the presence of multiple document types on a single page.

The method as disclosed above including determining the presence of a single document type on a multiple pages.

The method as disclosed above including determining the presence of multiple document types on multiple pages.

The method as disclosed above including determining the presence of single document types corresponding to multiple different time periods.

The method as disclosed above including determining the presence of single document types corresponding to multiple different accounts.

The method as disclosed above including performing stipulation document analysis and verification operations on the uploaded stipulation documents, the analysis and verification operations including optical character recognition and the application of one or more machine learning models.

The method as disclosed above including using domain-specific knowledge rules to merge pages of the stipulation documents.

The method as disclosed above wherein the stipulation documents are of a type from the group consisting of: Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™ Bookout Sheets, NADA™ Bookout Sheets, GAP Waiver Contracts, Vehicle Service Contracts, and Credit Life Disability Insurance Contracts.

A system comprising: a data processor; a network interface, in data communication with the data processor, for communication on a data network; and a document classification system, executable by the data processor, to: establish, by use of a data processor and a data network, a data connection with at least one applicant platform; receive an upload of required stipulation documents from the applicant platform via the data network, the uploaded stipulation documents including a plurality of pages; classify each page of the stipulation documents as being of a particular document type; and merge pages of the stipulation documents based on the document type classification.

The system as disclosed above being further configured to determine the presence of a single document type on a single page.

The system as disclosed above being further configured to determine the presence of multiple document types on a single page.

The system as disclosed above being further configured to determine the presence of a single document type on a multiple pages.

The system as disclosed above being further configured to determine the presence of multiple document types on multiple pages.

The system as disclosed above being further configured to determine the presence of single document types corresponding to multiple different time periods.

The system as disclosed above being further configured to determine the presence of single document types corresponding to multiple different accounts.

The system as disclosed above being further configured to perform stipulation document analysis and verification operations on the uploaded stipulation documents, the analysis and verification operations including optical character recognition and the application of one or more machine learning models.

The system as disclosed above being further configured to use domain-specific knowledge rules to merge pages of the stipulation documents.

The system as disclosed above wherein the stipulation documents are of a type from the group consisting of: Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™ Bookout Sheets, NADA™ Bookout Sheets, GAP Waiver Contracts, Vehicle Service Contracts, and Credit Life Disability Insurance Contracts.

A computer-implemented method comprising: establishing, by use of a data processor and a data network, a data connection with at least one applicant platform; receiving an upload of documents from the applicant platform via the data network; classifying each document as being of a particular document type; determining an information extraction strategy based on a document type classification of a particular document; and extracting information from the particular document based on the information extraction strategy.

The method as disclosed above including performing document pre-processing operations on the document.

The method as disclosed above including performing an optical character recognition (OCR) operation on the document.

The method as disclosed above including performing a spell correction operation on the document.

The method as disclosed above including performing a contextual phrase construction operation on the document.

The method as disclosed above including performing a spatial phrase construction operation on the document.

The method as disclosed above including performing feature extractions on the document, the extracted features including a plurality of sections of the document.

The method as disclosed above including performing feature extractions on the document, the extracted features including a checkbox.

The method as disclosed above including performing feature extractions on the document, the extracted features including a table.

The method as disclosed above including performing feature extractions on the document, the extracted features including a signature block.

The method as disclosed above including generating a connection matrix.

The method as disclosed above including performing key-value extractions from the document based on a document context.

The method as disclosed above including using a trained machine learning model to extract information from the document.

The method as disclosed above including using a context determined from a plurality of documents to extract information from the document.

The method as disclosed above wherein the document is of a type from the group consisting of: Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™ Bookout Sheets, NADA™ Bookout Sheets, GAP Waiver Contracts, Vehicle Service Contracts, and Credit Life Disability Insurance Contracts.

A system comprising: a data processor; a network interface, in data communication with the data processor, for communication on a data network; and an information extraction system, executable by the data processor, to: establish, by use of a data processor and a data network, a data connection with at least one applicant platform; receive an upload of documents from the applicant platform via the data network; classify each document as being of a particular document type; determine an information extraction strategy based on a document type classification of a particular document; and extract information from the particular document based on the information extraction strategy.

The system as disclosed above being further configured to perform a contextual phrase construction operation on the document.

The system as disclosed above being further configured to perform a spatial phrase construction operation on the document.

The system as disclosed above being further configured to perform feature extractions on the document, the extracted features including a plurality of sections of the document.

The system as disclosed above being further configured to perform feature extractions on the document, the extracted features including a checkbox.

The system as disclosed above being further configured to perform feature extractions on the document, the extracted features including a table.

The system as disclosed above being further configured to perform feature extractions on the document, the extracted features including a signature block.

The system as disclosed above being further configured to perform key-value extractions from the document based on a document context.

The system as disclosed above being further configured to use a trained machine learning model to extract information from the document.

The system as disclosed above being further configured to use a context determined from a plurality of documents to extract information from the document.

The system as disclosed above wherein the stipulation documents are of a type from the group consisting of: Government-Issued Photo IDs, Paystubs, Bank Statements, Social Security Income Award Letters, Job Offer Letters, Military Leave and Earnings Statements (LES) and Retiree Account Statements (RAS), Disability Insurance Award Letters, Student Financial Aid, Utility Bills, Insurance Cards, Insurance Declaration Pages, Fronts of State-Issued Vehicle Titles, Backs of State-Issued Vehicle Titles, Fronts of State Issued Vehicle Registration Cards, Powers of Attorney, Agreements to Furnish Insurance Policies, Risk-Based Pricing Notices, Credit Score Disclosure Exception Notices, Retail Installment Sales Contracts, Closed End Motor Vehicle Leases, Authorizations To Release Payoff Information, Acknowledgements Of Rewritten Contracts, Notices To Co-Signers, Applications for Title, Odometer Statements, Buyer's Orders or Lease Orders, Foreign Language Acknowledgements, Factory Invoices, Kelley Blue Book™ Bookout Sheets, NADA™ Bookout Sheets, GAP Waiver Contracts, Vehicle Service Contracts, and Credit Life Disability Insurance Contracts.

As described herein for various example embodiments, a document classification and information extraction system is disclosed. In the various example embodiments described herein, a computer-implemented tool or software application (app) as part of a document classification and information extraction system is described to automate and improve the collection and verification of stipulations between parties in a transaction and extract relevant information. In an example embodiment, documents are immediately analyzed and classified using machine learning techniques to provide real-time feedback to the applicant. In various example embodiments described herein, the document classification and information extraction system provides a document collection, information extraction, and verification system as it relates to the consumer finance industry, specifically, to indirect and direct auto lending. Indirect auto loan applicants and dealer personnel to date have not been able to take advantage of SMS capabilities that allow for secure Web links to be delivered to mobile devices (e.g., mobile phones)

so that parties to a transaction can use the cameras on their mobile devices to upload documents and get near real-time feedback on issues that could delay the lender from accepting the document. As such, the various embodiments as described herein are necessarily rooted in computer and network technology and serve to improve these technologies when applied in the manner as presently claimed. In particular, the various embodiments described herein improve the use of mobile device technology and data network technology in the context of product purchase and financing transactions via electronic means.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
   establishing, by use of a data processor and a data network, a data connection with at least one applicant platform;
   receiving an upload of documents from the applicant platform via the data network;
   classifying each document as being of a particular document type;
   determining an information extraction strategy based on a document type classification of a particular document, the information extraction strategy including performing extractions from the document based on the document type classification and a document context, the document context including an inference of document content drawn from document content extracted from a plurality of related documents, the document context further including applying domain-specific rules of a domain-aware business layer to bias document content extraction toward compliance with the domain-specific rules; and
   extracting information from the particular document based on the information extraction strategy and the document context.

2. The method of claim 1 including merging pages of the documents based on the document type classification.

3. The method of claim 1 including performing a spatial phrase construction operation on the document.

4. The method of claim 1 including performing feature extractions on the document, the extracted features including a plurality of sections of the document.

5. The method of claim 1 including performing feature extractions on the document, the extracted features including a checkbox, a table, or a signature block.

6. The method of claim 1 wherein the document context further includes use of applicant-stated information to make predictions regarding the document type classification or an entity's value.

7. The method of claim 1 including using a trained machine learning model to extract information from the document.

8. The method of claim 1 wherein the document context further includes use of approval terms of a loan application to make predictions regarding the document type classification.

9. The method of claim 1 including performing major rotations or minor rotations of a document.

10. The method of claim 1 including modifying a document type classification of a first document based on information extracted from a different second document.

11. A system comprising:
    a data processor;
    a network interface, in data communication with the data processor, for communication on a data network; and
    an information extraction system, executable by the data processor, to:
      establish, by use of a data processor and a data network, a data connection with at least one applicant platform;
      receive an upload of documents from the applicant platform via the data network;
      classify each document as being of a particular document type;
      determine an information extraction strategy based on a document type classification of a particular document, the information extraction strategy including performing extractions from the document based on the document type classification and a document context, the document context including an inference of document content drawn from document content extracted from a plurality of related documents, the document context further including applying domain-specific rules of a domain-aware business layer to bias document content extraction toward compliance with the domain-specific rules; and
      extract information from the particular document based on the information extraction strategy and the document context.

12. The system of claim 11 being further configured to merge pages of the documents based on the document type classification.

13. The system of claim 11 being further configured to perform a spatial phrase construction operation on the document.

14. The system of claim 11 being further configured to perform feature extractions on the document, the extracted features including a plurality of sections of the document.

15. The system of claim 11 being further configured to perform feature extractions on the document, the extracted features including a checkbox, a table, or a signature block.

16. The system of claim 11 being further configured to use a trained machine learning model to extract information from the document.

17. The system of claim 11 wherein the document context further includes use of applicant-stated information to make predictions regarding the document type classification or an entity's value.

18. The system of claim 11 wherein the document context further includes use of approval terms of a loan application to make predictions regarding the document type classification.

19. The system of claim 11 being further configured to perform major rotations or minor rotations of a document.

20. The system of claim 11 being further configured to modify a document type classification of a first document based on information extracted from a different second document.

* * * * *